US011448842B2

(12) United States Patent
Bickham et al.

(10) Patent No.: US 11,448,842 B2
(45) Date of Patent: Sep. 20, 2022

(54) SMALL DIAMETER FIBER OPTIC CABLES HAVING LOW-FRICTION CABLE JACKETS AND OPTICAL FIBERS WITH REDUCED CLADDING AND COATING DIAMETERS

(71) Applicant: CORNING RESEARCH & DEVELOPMENT CORPORATION, Corning, NY (US)

(72) Inventors: Scott Robertson Bickham, Corning, NY (US); William Carl Hurley, Hickory, NC (US); Ulrich Wilhelm Heinz Neukirch, Painted Post, NY (US); Radawan Ripumaree, Hickory, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 17/210,734

(22) Filed: Mar. 24, 2021

(65) Prior Publication Data
US 2021/0231896 A1 Jul. 29, 2021

Related U.S. Application Data

(63) Continuation of application No. PCT/US2019/053047, filed on Sep. 26, 2019.
(Continued)

(51) Int. Cl.
*G02B 6/44* (2006.01)
*G02B 6/02* (2006.01)
(Continued)

(52) U.S. Cl.
CPC ....... *G02B 6/4438* (2013.01); *G02B 6/02395* (2013.01); *G02B 6/04* (2013.01); *G02B 6/0281* (2013.01); *G02B 6/0365* (2013.01)

(58) Field of Classification Search
None
See application file for complete search history.

(56) References Cited

U.S. PATENT DOCUMENTS

| 6,801,695 B2 | 10/2004 | Lanier et al. |
| 6,912,347 B2 | 6/2005 | Rossi et al. |
| (Continued) | | |

FOREIGN PATENT DOCUMENTS

| EP | 1821124 A1 | 8/2007 |
| JP | 2001-052526 A | 2/2001 |
| WO | 2018/153489 A1 | 8/2018 |

OTHER PUBLICATIONS

A. Kewitsch, "Large-Scale, All-Fiber Optical Cross-Connect Switches for Automated Patch-Panels," J. Lightwwave Technol. 27, pp. 3107-3115 (Aug. 1, 2009).
(Continued)

*Primary Examiner* — Michelle R Connelly
(74) *Attorney, Agent, or Firm* — William D. Doyle

(57) ABSTRACT

A fiber optic cable includes a cable jacket having an outer surface defined by a cable jacket outer diameter $J_{OD}$ and an inner surface defined by a cable jacket inner diameter $J_{ID}$; a plurality N of optical fibers, where N≥4, contained within the cable jacket and positioned a distance away from the cable jacket inner diameter, with each optical fiber having a core, a cladding surrounding the core, and at least one coating surrounding the core with the at least one coating having an outer coating diameter less than or equal to about 200 microns and wherein the cable jacket outer diameter $J_{OD}$ is less than or equal to 1 mm.

20 Claims, 11 Drawing Sheets

Related U.S. Application Data

(60) Provisional application No. 62/738,174, filed on Sep. 28, 2018.

(51) Int. Cl.
    *G02B 6/04* (2006.01)
    *G02B 6/028* (2006.01)
    *G02B 6/036* (2006.01)

(56) References Cited

U.S. PATENT DOCUMENTS

| | | | |
|---|---|---|---|
| 7,321,709 | B2 | 1/2008 | Yokokawa et al. |
| 7,897,873 | B2 | 3/2011 | Gemme et al. |
| 9,057,856 | B2 | 6/2015 | Homma et al. |
| 9,322,704 | B1 | 4/2016 | Neveux |
| 9,869,814 | B2 * | 1/2018 | Molin ............... G02B 6/02042 |
| 11,181,685 | B2 * | 11/2021 | Abedijaberi ....... G02B 6/02395 |
| 11,181,686 | B2 * | 11/2021 | Bennett ............. G02B 6/02395 |
| 11,181,687 | B2 * | 11/2021 | Bennett ............. G02B 6/02395 |
| 2005/0207715 | A1 | 9/2005 | Roba et al. |
| 2008/0285925 | A1 * | 11/2008 | Graveston ............ G02B 6/4432 385/107 |
| 2009/0279836 | A1 | 11/2009 | de Montmorillon et al. |
| 2011/0188826 | A1 | 8/2011 | Sillard et al. |
| 2013/0058613 | A1 | 3/2013 | Jost et al. |
| 2015/0192749 | A1 | 7/2015 | Sakabe et al. |
| 2016/0173964 | A1 | 6/2016 | Weldon et al. |
| 2016/0299309 | A1 | 10/2016 | Boxer et al. |
| 2017/0343751 | A1 | 11/2017 | Bookbinder et al. |
| 2018/0095219 | A1 | 4/2018 | Bookbinder et al. |
| 2018/0215661 | A1 | 8/2018 | Kouzmina et al. |
| 2021/0116660 | A1 * | 4/2021 | Kamath ............... G02B 6/4432 |

OTHER PUBLICATIONS

International Search Report and Written Opinion of the International Searching Authority; PCT/US2019/053047; dated Jan. 2, 2020, 13 pages; European Patent Office.

M. Iwaya et al., "Development of Optical Wiring Technology for Optical Interconnects," Furukawa Review vol. 41, pp. 1-5 (2012).

European Patent Application No. 19864485.8, Extended European search report, dated Jun. 20, 2022; 13 pages; European Patent Office.

* cited by examiner

SMALL DIAMETER FIBER OPTIC CABLES HAVING LOW-FRICTION CABLE JACKETS AND OPTICAL FIBERS WITH REDUCED CLADDING AND COATING DIAMETERS

CROSS REFERENCE TO RELATED APPLICATIONS

This application is a continuation of International Application No. PCT/US2019/053047, filed Sep. 26, 2019, which claims the benefit of priority of U.S. Provisional Application Ser. No. 62/738,174, filed on Sep. 28, 2018, the content of each of which is relied upon and incorporated herein by reference in its entirety.

BACKGROUND

The present disclosure generally relates to fiber optic cables. More particularly, this disclosure relates to small-diameter fiber optic cables having cable jackets with low coefficients of friction and optical fibers with reduced cladding and coating diameters.

Fiber optic cables include optical fibers that transmit signals, for example, voice, video, and/or data. Cable structures protect the relatively fragile silica-based optical fibers and preserve the optical performance thereof. Because optical fibers are not ductile they must be protected from external forces. Additionally, optical fibers require protection from macrobending and/or microbending which can cause undesired optical degradation.

To meet these requirements, fiber optic cables designed for indoor, outdoor, or indoor/outdoor applications typically include a cable core surrounded by a sheath system that generally includes a cable jacket. For example, a cable core may include an optical fiber, a strength element, and/or a separation layer. The separation layer is generally on the outer surface of the cable core and prevents the extruded cable jacket from sticking to the cable core and/or optical fiber, thereby allowing relative movement between cable jacket and the cable core and/or optical fiber. As such, jacket materials having low coefficients of friction are desired.

An optical fiber generally includes a core, a cladding, and a coating. The core is manufactured from one or more materials having an index of refraction greater than that of the cladding. These differences in the indexes of refraction promote internal reflection and allow for the transmission of optical signals. The cladding is coated with one or more coating layers, e.g. UV-curable acrylate polymer.

Optical fibers can transmit optical signals with relatively low optical attenuation. Although the core is encapsulated by a cladding and a coating, the optical fiber still has sensitive nature. The fibers often experience relatively high increases in optical attenuation, particularly when subjected to tensile, bending, or torsional stresses and/or strains.

Optical fibers with small cladding and coating diameters, e.g. smaller than 125 microns, are attractive for reducing the size of cables, decreasing cable cost, and increasing the bandwidth density of optical interconnects. It is also desirable to use thinner layers as primary and/or secondary coatings in reduced-cladding diameter fibers. However, smaller cladding diameters can increase microbending sensitivity, and thinner primary and coating diameters further compromise microbend performance as well as the protective function of the coatings. Small diameter optical fibers have been used in photonic devices, such as gyroscopes, where space is at a premium. As such, there is a push in the telecom industry to increase the number of optical fibers used to connectorize components particularly in servers and switches.

Optical fibers with reduced-coating diameters have been proposed, but the cladding diameter of many prior optical fibers have been maintained at the conventional value of 125 microns. Decreasing the cladding diameter to 90 microns or smaller increases the micro-bending sensitivity by an order of magnitude compared to fibers with cladding diameters of 125 microns, and the coating solutions proposed are often not sufficient to achieve low attenuation and low bend losses.

In view of the above considerations, there is a clearly a need for small diameter fiber optic cables having cable jackets with low coefficients of friction. Moreover, there is a clear need for small diameter fiber optic cables, including optical fibers with reduced cladding and coating diameters.

SUMMARY

Aspects of the disclosure are directed to embodiments of small-diameter fiber optic cables having cable jackets with low coefficients of friction and optical fibers with reduced cladding and coating diameters. More particularly, embodiments of the small-diameter fiber optic cables disclosed herein include optical fiber having an outer cladding diameter of 90 microns or less (e.g., or 85 microns or less, or 70 microns or less) that possess large mode field diameters without experiencing significant bending-induced signal degradation.

A particular aspect of the disclosure is directed to embodiments of fiber optic cables, including a cable jacket having an outer surface defined by a cable jacket outer diameter $J_{OD}$ and an inner surface defined by a cable jacket inner diameter $J_{ID}$; a plurality N of optical fibers contained within the cable jacket and positioned a distance away from the cable jacket inner diameter. Each optical fiber has a core, a cladding surrounding the core, and at least one coating surrounding the core, with the at least one coating having a coating diameter less than or equal to about 180 microns. In addition, the cable jacket outer diameter JOD is less than or equal to 1 mm, and the cable jacket has at least one material having a coefficient of friction ranging from about 0.04 to about 0.4.

Another aspect of the disclosure is directed to a fiber optic cable, including a plurality N of optical fibers with each optical fiber having a core with an outer radius $r_1$; a cladding surrounding the core with an outer radius $r_4$ such that $r_4$ is less than 45 microns. In addition, a primary coating surrounds the cladding with the primary coating being defined by an outer radius $r_5$ and a thickness $t_P>10$ microns, an in situ modulus $E_P$, wherein $E_P$ is 0.35 MPa or less, and a spring constant $\chi_P<1.6$ MPa, where $\chi_P=2E_P r_4/t_P$. The optical fiber also includes a secondary coating that surrounds the primary coating, with the secondary coating having an outer radius $r_6$ and a thickness $t_S=r_6-r_5$, and an in situ modulus of 1200 MPa or greater. In addition, $t_S$ is preferably greater than 10 microns, the outer radius $r_6$ is 85 microns or less, and the optical fiber has a mode field diameter MFD greater than 8.2 microns at 1310 nm, a fiber cutoff wavelength of less than 1310 nm. Moreover, the optical fiber preferably exhibits a bend loss when wrapped around a mandrel having a diameter of 10 mm, of less than 1.0 dB/turn at a wavelength of 1550 nm.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Figure 1:
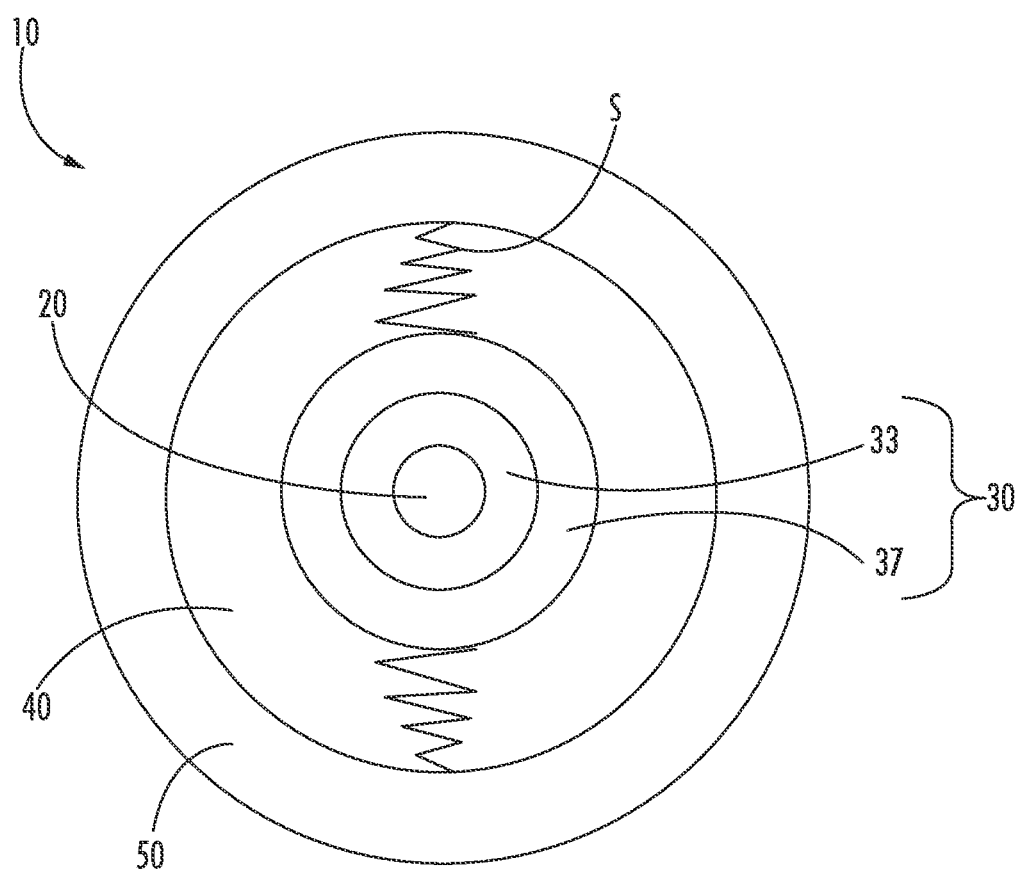
FIG. 1 schematically shows a cross-section of a fiber having a core, an inner cladding region, an outer cladding region, a primary coating and a secondary coating.

Reference will now be made in detail to the present embodiments, examples of which are illustrated in the accompanying drawings. Whenever possible, the same reference numerals will be used throughout the drawings to refer to the same or like parts.

Like numbers may refer to like elements throughout. In the FIGS., the thickness of certain lines, layers, components, elements or features may be exaggerated for clarity.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/". As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present.

It will be understood that, although the terms "first", "second", etc. may be used herein to describe various elements, components, etc., these elements, components, etc. should not be limited by these terms. These terms are only used to distinguish one element, component, etc. from another element, component, etc. Thus, a "first" element or component discussed below could also be termed a "second" element or component without departing from the teachings of the present invention. In addition, the sequence of operations (or steps) is not limited to the order presented in the claims unless specifically indicated otherwise.

The present disclosure relates to fiber optic cables, including optical fibers that may combine small cladding and coating diameters, a large mode field diameter, low fiber cutoff wavelength, low attenuation and low macro-bend loss.

A brief explanation of selected terminology used herein is now presented:

The "refractive index profile" is the relationship between refractive index or relative refractive index and fiber radius.

The "relative refractive index delta" is defined as $$\Delta\% = 100\frac{n^2(r) - n_s^2}{2n^2(r)}$$

where n(r) is the refractive index of the optical fiber at the radial distance r from the fiber's centerline, unless otherwise specified, and $n_s$=1.444 is the refractive index of pure silica at a wavelength of 1550 nm. As used herein, the relative refractive index percent (also referred herein as the relative refractive index) is represented by $\Delta$ (or "delta"), $\Delta$ % (or "delta %"), or %, all of which are used interchangeably herein, and its values are given in units of percent or %, unless otherwise specified. Relative refractive index may also be expressed as $\Delta(r)$ or $\Delta(r)$%.

"Chromatic dispersion", which may also be referred to as "dispersion", of a waveguide fiber is the sum of the material dispersion, the waveguide dispersion, and the intermodal dispersion at a wavelength $\lambda$. In the case of single-mode waveguide fibers, the inter-modal dispersion is zero. Dispersion values in a two-mode regime assume intermodal dispersion is zero. The zero-dispersion wavelength ($\lambda_0$) is the wavelength at which the dispersion has a value of zero. Dispersion slope is the rate of change of dispersion with respect to wavelength.

The term "α-profile" refers to a relative refractive index profile A(r) that has the following functional form:

$$\Delta(r) = \Delta(r_0)\left[1 - \left[\frac{|r-r_0|}{(r_1-r_0)}\right]^\alpha\right]$$

where $r_o$ is the point at which $\Delta(r)$ is maximum, $r_1$ is the point at which $\Delta(r)$ is zero, and r is in the range $r_i \le r \le r_f$, where $r_i$ is the initial point of the α-profile, $r_f$ is the final point of the α-profile, and a is a real number. In some embodiments $r_i=0$ and $r_f=r_1$.

The mode field diameter (MFD) is measured using the Petermann II method and is determined from:

$$MFD = 2w$$

$$w^2 = 2\frac{\int_0^\infty (f(r))^2 r\, dr}{\int_0^\infty \left(\frac{df(r)}{dr}\right)^2 r\, dr}$$

where f(r) is the transverse electric field distribution of the LP01 mode and r is the radial position in the fiber.

The microbend resistance of a waveguide fiber may be gauged by induced attenuation under prescribed test conditions. Various tests are used to assess microbending losses including the lateral load microbend test, wire mesh covered drum microbend test, and mandrel wrap test.

In the lateral load test, a prescribed length of waveguide fiber is placed between two flat plates. A #70 wire mesh is attached to one of the plates. A known length of waveguide fiber is sandwiched between the plates, and a reference attenuation at a selected wavelength (typically within the range of 1200-1700 nm, e.g., 1310 nm or 1550 nm or 1625 nm) is measured while the plates are pressed together with a force of 30 Newtons. A 70 Newton force is then applied to the plates, and the increase in attenuation at the selected wavelength in dB/m is measured. The measured increase in attenuation is the lateral load wire mesh (LLWM) attenuation of the waveguide.

In the wire mesh covered drum test, a 400 mm diameter aluminum drum is wrapped with wire mesh. The mesh is wrapped tightly without stretching. The wire mesh should be intact without holes, dips, or damage. The wire mesh material used in the measurements herein was made from corrosion-resistant type 304 stainless steel woven wire cloth and had the following characteristics: mesh per linear inch: 165×165, wire diameter: 0.0019", width opening: 0.0041", and open area %: 44.0. A prescribed length (750 m) of waveguide fiber is wound at 1 m/s on the wire mesh drum at 0.050 cm take-up pitch while applying 80 (+/−1) grams of tension. The ends of the prescribed length of fiber are taped to maintain tension and there are no fiber crossovers. The attenuation of the optical fiber is measured at a selected wavelength (typically within the range of 1200-1700 nm, e.g., 1310 nm or 1530 nm or 1625 nm). A reference attenuation is measured for the optical fiber wound on a smooth drum (i.e. a drum without a wire mesh). The increase in fiber attenuation (in dB/km.) in the measurement performed on the drum with the wire mesh relative to the measurement performed on the smooth drum is reported as the wire mesh covered drum attenuation of the optical fiber at the selected wavelength.

The macrobend performance of the optical fiber can be gauged by measuring the induced attenuation increase in a mandrel wrap test. In the mandrel wrap test, the optical fiber is wrapped one or more times around a cylindrical mandrel having a specified diameter, and the increase in attenuation at a specified wavelength due to the bending is determined. Attenuation in the mandrel wrap test is expressed in units of dB/turn, where one turn refers to one revolution of the optical fiber about the mandrel.

The optical fiber and cabled fiber cutoff wavelengths can be measured according to the procedures defined in FOTP-80 IEC-60793-1-44 Optical Fibres—Part 1-44: Measurement Methods and Test Procedures—Cut-Off Wavelength. All methods require a reference measurement, which in the case of a bend-insensitive single-mode fiber should be the multimode-reference technique rather than the bend-reference technique.

The present disclosure provides reduced diameter coated fibers with excellent microbending and macrobending performance and a mode field diameter that may permit splicing and connecting to G.657 single-mode fibers (e.g. Corning® SMF-28e+® and Corning® SMF-28® Ultra) with minimal losses. The coated fibers of the present disclosure may overcome trade-offs in the mode field diameter (MFD), attenuation and/or bending losses that have accompanied efforts in the prior art to manufacture optical fibers with a reduced cladding diameter. With the present coated fibers, small cladding and coating diameters may be achievable without sacrificing mode field diameter or bending performance. The present disclosure accordingly may provide compact coated fibers that can be assembled in high density configurations for internal installations and yet provide good matching and low losses when integrated with external single-mode fibers. Different profile designs that are described result in good fiber microbend and macrobend performance even when the thicknesses of the coating layers are small. Mechanical properties, compositions, and geometry of reduced-thickness primary and secondary coating layers that may yield low microbending and macrobending losses and good puncture resistance are disclosed. Unless otherwise specified, all wavelength-dependent results are based on a wavelength of 1550 nm.

The embodiments of the coated fibers may include a cladding having two regions and a refractive index profile that differs in these two regions. The design of the refractive index profile of the cladding may include a refractive index trench that diminishes the sensitivity of the coated fiber to bending, which may enable use of a primary coating and/or secondary coating with reduced thickness relative to commercially available fibers. The thinner coating thickness of the optical fiber embodiments described herein advantageously provides compact coated fibers that can be densely packed and/or readily installed in existing fiber infrastructures. The mechanical properties of the primary coating are selected such that good microbending performance of the coated fiber is achieved, even when the thickness of the primary coating is reduced. The mechanical properties of the secondary coating are selected such that good puncture resistance of the coated fiber is achieved, even when the thickness of the secondary coating is reduced.

Figure 2:
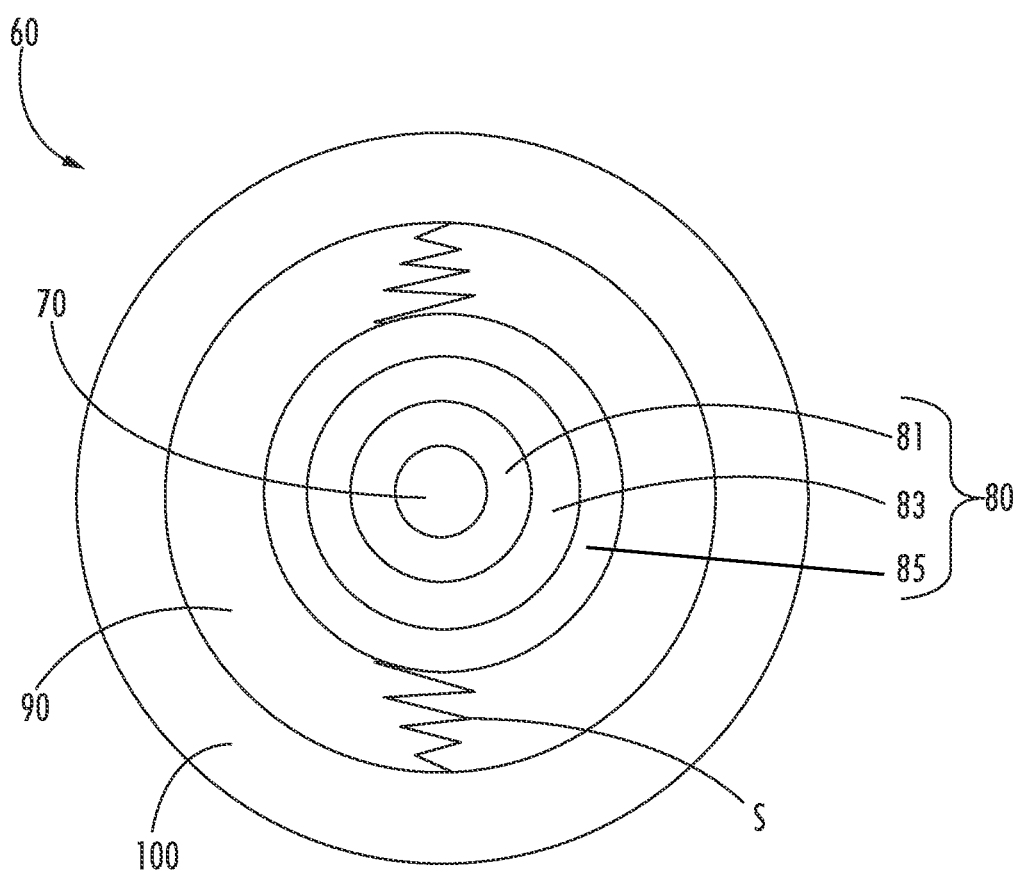
FIG. 2 schematically shows a cross-section of a fiber having a core, two inner cladding regions, an outer cladding region, a primary coating and a secondary coating.

The coated fibers of the present disclosure may include a core, a cladding, a primary coating, and a secondary coating, where the cladding may include two or more regions with differing refractive index profiles. A schematic cross-sectional depiction of a first embodiment of the coated fibers in accordance with the present disclosure is shown in FIG. 1. Fiber 10 includes core 20, cladding 30, primary coating 40, and secondary coating 50. Cladding 30 includes inner cladding region 33 and outer cladding region 37. The schematic cross-section of a second embodiment of the coated fibers is shown in FIG. 2. Fiber 60 shown in FIG. 2 includes core 70, cladding 80, primary coating 90 and secondary coating 100. Cladding 80 includes first inner cladding region 81, second inner cladding region 83, and outer cladding region 85.

The core and cladding may be silica or silica-based glass and may optionally include an updopant or a downdopant. Silica-based glass may be silica glass modified by an alkali or alkaline earth element, one or more halogens, or other dopants. The radius of the core may be in the range of 3.6 to 5.4 microns, for example 4 to 5 microns or 4.2 to 4.8 microns. The refractive index across the core may be constant or variable. The core refractive index may be at a maximum at or near the center of the core and may continuously decrease in the direction of the outer core boundary. The core refractive index profile may be or may approximate a Gaussian profile, an α-profile, a step profile or a rounded step index profile with an alpha value in the range between 6 and 12. The maximum or peak refractive index delta of the core $\Delta_{1MAX}$ may be in the range from 0.32% to 0.42%, or from 0.34% to 0.40%, or from 0.35% to 0.39%.

The core region may be characterized by a core profile volume, $V_1$, in units of %-microns$^2$, equal to:

$$V_1 = 2\int_0^{r1} \Delta(r) r dr$$

The magnitude $|V_1|$ of the core volume may be at least 5.8%-microns$^2$, or at least 6.0%-microns$^2$, or at least 6.2%-microns$^2$. The magnitude $|V_1|$ of the core volume may also be less than 6.8%-microns$^2$, or less than 6.6%-microns$^2$, or between 5.8%-microns$^2$ and 6.8%-microns$^2$, or between 6.0%-microns$^2$ and 6.6%-microns$^2$.

The glass cladding may include two or more regions that differ in refractive index profile and may extend to an outer radius of not greater than 45 microns, or not greater than 42 microns, or not greater than 40 microns, or not greater than 35 microns, or not greater than 32.5 microns, or not greater than 30 microns. According to some embodiments the outer radius of the glass cladding is between 25 microns and 45 microns, or between 30 microns and 42 microns, or between 35 microns and 42 microns, or between 38 microns and 42 microns, or between 25 microns and 35 microns. According to some embodiments, at least one region of the glass cladding 30, 80 is down-doped relative to silica (for example, by F or B).

The cladding 30, 80 may include at least one inner cladding region surrounded by an outer cladding region, where the inner cladding region may have a lower refractive index than the outer cladding region. The refractive index of the inner cladding region may be constant or continuously varying. The refractive index of the inner cladding region may form a trench in the refractive index profile of the coated fiber. The trench is a depressed index region and may be approximately rectangular or triangular. The outer cladding region may have a constant or continuously varying refractive index. The minimum refractive index of the inner core region may be less than the maximum refractive index of the outer cladding region.

The cladding may include a first inner cladding region adjacent the core and a second inner cladding region disposed between the first inner cladding region and the outer cladding region. The refractive index of the second inner cladding region may be lower than the refractive index of the first inner cladding region. (See, e.g., FIGS. 3 and 4.) The minimum refractive index of the second inner cladding region may be lower than the maximum refractive index of the first inner cladding region. The refractive index of the second inner cladding region may be lower than the refractive index of the outer cladding region. The minimum refractive index of the second inner cladding region may be lower than the maximum refractive index of the outer cladding region. The refractive index of the second inner cladding region may be lower than the refractive indices of the first inner cladding region and the outer cladding region. The minimum refractive index of the second inner cladding region may be lower than the maximum refractive indices of the first inner cladding region and the outer cladding region.

The refractive index of the second inner cladding region may be constant or varying (e.g., continually varying). The refractive index of the second inner cladding region may form a trench in the refractive index profile of the coated fiber. The trench is a depressed index region and may be rectangular or triangular. The relative refractive index delta of the trench $\Delta_3$ may be less than −0.2%, less than −0.25%, less than −0.3% or less than −0.35%. The relative refractive index delta of the trench $\Delta_3$ may be greater than −0.6%, greater than −0.55%, greater than −0.5%, greater than −0.45%, or between −0.2% and −0.6%, or between −0.25% and −0.55%, or between −0.3% and −0.5%. The inside radius of the trench $r_2$ may be greater than 9.0 microns, or greater than 9.4 microns, or greater than 9.8 microns. The inside radius of the trench $r_2$ may be less than 11.2 microns, or less than 10.8 microns, or less than 10.4 microns, or between 9.0 and 11.2 micron, or between 9.4 and 10.8 microns. The outside radius of the trench $r_3$ may be greater than 14.0 microns, or greater than 14.5 microns, or greater than 15.0 microns. The outside radius of the trench $r_3$ may be less than 18.0 microns, or less than 17.5 microns, or less than 17.0 microns, or between 14.0 and 18.0 micron, or between 15.0 and 17.0 microns.

The depressed index region may be characterized by a profile trench volume, $V_3$, in units of %-microns$^2$, equal to:

$$V_3 = 2\int_{r2}^{r3} \Delta(r) r dr$$

The magnitude $|V_3|$ of the trench volume may be at least 40%-microns$^2$, or at least 45%-microns$^2$, or at least 50%-microns$^2$. The magnitude $|V_3|$ of the trench volume may also be less than 75%-microns$^2$, or less than 70%-microns$^2$, or between 40%-microns$^2$ and 70%-microns$^2$.

The primary coating 40, 90 of the optical fiber 10, 60 is structured to act as a spring (shown shematically as a spring S in FIGS. 1 and 2) that couples the glass portion (i.e., cladding 30, 80) of the optical fiber to the secondary coating 50, 100.

Commercially-available optical fibers with small outer cladding diameters and small coated fiber diameters suffer from microbending losses unless the mode field diameter is reduced or the cutoff wavelength is increased. Improving microbending losses for such fibers has been difficult if the total thickness of the primary and secondary coatings has a smaller value than the 58.5-62.5 micron value for standard telecommunication fibers. Decreasing the modulus of the primary coating can help reduce the microbending sensitivity of the fiber, but the thickness of the primary coating can only be increased if there is a concomitant decrease in the thickness of secondary coating given the constraint on the total thickness of the two coating layers. Decreasing the secondary coating thickness is undesirable because it reduces puncture resistance of the coated fiber. However, applicants discovered that optical fibers with small outer coating diameters (≤170 microns), and a small outer cladding diameter (≤90 microns) can have surprisingly good microbending and good resistance to puncture if the thicknesses of the primary and secondary coatings are each at least about 10 microns. In some embodiments, the relative coating thickness, $t_P/t_S$, is in the range $0.5 \leq t_P/t_S \leq 1.5$.

More specifically, the embodiments of the optical fiber have a primary coating 40, 90, that has an in situ elastic modulus $E_P$ of 0.35 MPa or less and a minimum thickness of $t_P$ of 10 microns (e.g., a thickness of 12.5 microns, 15 microns, 17.5 microns, or 20 microns), and in these embodiments the primary coating 30, 90 (acts as a "spring" that couples the stiff glass portion (e.g., cladding 30, 80) to the relatively stiff secondary coating 50, 100 that has an in situ elastic modulus greater than 1200 MPa, or greater than 1400 MPa, or greater than 1500 MPa, or even greater than 1800 MPa. The spring constant of the primary coating 40, 90 is defined as $\chi_P = E_P \cdot d_4/t_P$, where $d_4$ is the diameter of the glass portion of the optical fiber (i.e., it is the outer diameter of the glass cladding or $2r_4$), and $t_P$ and $E_P$ are the thickness and modulus, respectively, of the primary coating 40, 90. In the optical fiber embodiments described the spring constant of the primary coating has a value $\chi_P \leq 1.6$ MPa (preferably $\chi_P \leq 1.2$ MPa, more preferably $\chi_P \leq 1.0$ MPa, and even more preferably $\chi_P \leq 0.8$ MPa), which is desirable for improved microbending resistance (lower microbending losses), since a small spring constant provides lower degree of coupling between the glass portion of the optical fiber and the secondary coating.

Therefore, according to the embodiments discussed herein, when the optical fiber has an outer coating diameter ≤170 microns, and an outer glass cladding diameter ≤90 microns, a secondary coating 50, 100 with in situ elastic modulus greater than 1200 MPa (and preferably >1500 MPa) and a thickness $t_S$ greater or equal to 10 microns, and a primary coating 40, 90 with an situ elastic modulus $E_P \leq 0.35$ MPa, a spring constant $\chi_P \leq 1.6$ MPa and a thickness of at least 10 microns (e.g., 10 microns ≤ tp ≤ 15 microns). It is even more preferable that $\chi_P < 1.5$ MPa or $\chi_P \leq 1.4$ MPa, or $\chi_P \leq 1.3$ MPa, or $\chi_P \leq 1.2$ MPa. In at least some embodiments disclosed herein the primary coating has a spring constant $\chi_P \leq 1.1$ MPa, $\chi_P \leq 1.0$ MPa, $\chi_P \leq 0.9$ MPa, $\chi_P \leq 0.8$ MPa, $\chi_P \leq 0.7$ MPa, or $\chi_P \leq 0.6$ MPa. For example, in some embodiments, 0.5 MPa ≤ $\chi_P$ ≤ 1.5 MPa; 0.5 MPa ≤ $\chi_P$ ≤ 1.2 MPa; 0.6 MPa ≤ $\chi_P$ ≤ 1.0 MPa. Alternatively, if the optical fiber has an additional coating (tertiary coating) situated on top of the secondary coating (e.g., an ink or a coating containing ink) with a thickness $t_T$, then the sum of the secondary and tertiary coating thickness ($t_S + t_T$) s preferably ≥10 microns, and more preferably ≤12 microns, for example 12 microns ≤ ($t_S + t_T$) ≤ 30 microns. The combined cross-sectional areas of the secondary and optional tertiary coating layers for the embodiments of fibers disclosed herein is preferably 20000 sq. microns or greater, more preferably 25000 sq. microns or greater and even more preferably 30000 sq. microns or greater, which advantageously ensures that the optical fiber has sufficient puncture resistance.

In some embodiments, $t_T$ is between 0 and 6 microns, for example, $t_T$=3 microns, 4 microns, or 5 microns.

Table 1A below provides some exemplary embodiments of the optical fibers that have an outer cladding diameter of about 80 microns (i.e., $r_4$=40 microns), an outer coating diameter less than 170 microns, low attenuation and excellent bending performance. These fibers have: primary coating situ modulus $t_P \leq 0.35$ MPa, primary coating thickness $t_P$ such that 10 microns ≤ $t_p$ ≤ 30 microns; a primary coating spring constant $\chi_P \leq 1.6$ MPa (e.g., $\chi_P \leq 1.2 <$MPa, ≤1.0 MPa and even ≤0.8 MPa), a secondary coating diameter in the range between about 155 and 165 microns, a secondary coating situ modulus $t_S \geq 1200$ MPa, and a secondary coating thickness $t_S$ such that 10 microns ≤ $t_S$ ≤ 30 microns. The tertiary coating thickness $t_T$ in these embodiments is in the range between 0 and 6 microns (i.e., in some embodiments there is no tertiary coating, thus the tertiary coating thickness $t_T$=0). Other fiber embodiments contain a tertiary coating with a thickness $t_T$ between 2 and 6 microns. In these exemplary embodiments the sum $t_S + t_T$ is between 10 and 30 microns, i.e., 12 microns ≤ ($t_S + t_T$) ≤ 30 microns. In some embodiments, the puncture resistance load of the optical fiber is greater than 20 grams. In some embodiments, the puncture resistance load of the optical fiber is greater than 25 grams. In some embodiments, the puncture resistance load of the optical fiber is greater than 30 grams. The combined cross-sectional areas of the secondary and optional tertiary coating layers for the embodiments of fibers disclosed in Table 1A is also greater than 20000 sq. microns, which further improves the puncture resistance.

TABLE 1A

| Parameter | Example 1 | Example 2 | Example 3 | Example 4 | Example 5 |
| --- | --- | --- | --- | --- | --- |
| Outer Cladding Diameter ($2r_4$, microns) | 80 | 80.5 | 80 | 80 | 80.5 |
| Primary Coating in situ Modulus ($E_P$, MPa) | 0.26 | 0.2 | 0.3 | 0.2 | 0.2 |
| Primary Coating Thickness ($t_P$, microns) | 20 | 20 | 15 | 25 | 25 |
| Primary Coating Diameter (microns) | 120 | 120.5 | 110 | 130 | 130.5 |
| Primary Coating Spring Constant ($\chi_P$, MPa) | 1.04 | 0.805 | 1.60 | 0.64 | 0.64 |
| Secondary Coating Thickness ($t_S$, microns) | 22.5 | 18.5 | 22.5 | 12.5 | 17.5 |
| Secondary Coating Diameter (microns) | 165 | 157 | 155 | 155 | 165 |
| Secondary Coating in situ Modulus (MPa) | 1400 | 1800 | 1600 | 1500 | 1250 |
| Tertiary Coating Thickness (microns) | 0 | 4 | 5 | 5 | 0 |
| Secondary + Tertiary Coating Thickness ($t_S + t_T$, microns) | 22.5 | 22.5 | 27.5 | 17.5 | 17.5 |
| Ratio of Primary Coating Thickness to (Secondary + Tertiary) Coating Thickness [$t_P/(t_S + t_T)$] | 0.89 | 0.89 | 0.55 | 1.43 | 1.43 |
| Secondary + Tertiary Coating Cross Sectional Area (sq. microns) | 40291 | 39913 | 47517 | 32437 | 32028 |
| Coated Fiber Diameter ($2r_6$, microns) | 165 | 165 | 165 | 165 | 165 |

Figure 3:
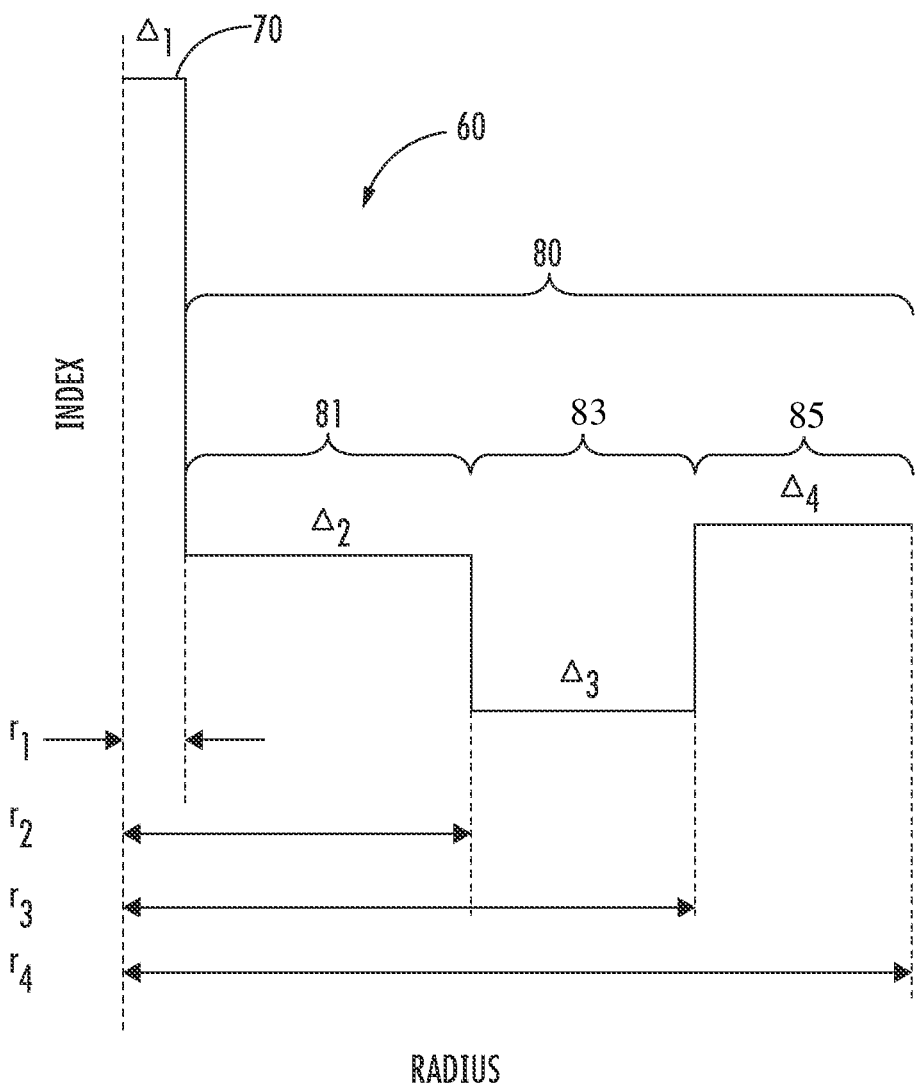
FIG. 3 schematically shows an illustrative core-cladding refractive index profile according to exemplary embodiments disclosed herein.

An exemplary refractive core-cladding index profile of such fibers is shown schematically in FIG. 3. The refractive index profile parameters and modelled attributes of several exemplary embodiments corresponding to FIG. 3 are given in Tables 1B and 1C. The optical properties of these exemplary fiber embodiments are as follows: the mode field diameter MFD at 1310 nm is between 8.2 and 9.4 microns; the mode field diameter MFD at 1550 nm is between 9.2 and 10.4 microns, the zero dispersion wavelength is between 1302 and 1320 nm; the optical fiber cutoff is between 1180 and 1300 nm; and the macrobend loss at 1550 nm is less than 0.5 dB/turn when the optical fiber is wrapped around a mandrel having a diameter of 10 mm. The fibers embodiments of Tables 1B and 1C (Fiber 1-Fiber 10) can be constructed, for example, with an outer cladding diameter $2R_4$ of about 80-81 microns as described in Table 1A and utilizing the primary and secondary coatings of Table 1A. In some exemplary embodiment of Fibers 1-Fibers 10 is $\Delta_4$ (%)=0, and the outer cladding is made of pure silica. In other exemplary embodiments of Fibers 1-Fibers 10, $2R_4$ has a value of about 80-81 microns and the outer cladding can be updoped or down doped relative to pure silica, but $\Delta_4 > \Delta_{3MIN}$.

TABLE 1B

|  | Fiber 1 | Fiber 2 | Fiber 3 | Fiber 4 | Fiber 5 |
|---|---|---|---|---|---|
| $\Delta_{IMAX}$ (%) | 0.399 | 0.401 | 0.394 | 0.391 | 0.382 |
| $r_1$ | 4.33 | 4.38 | 4.26 | 4.37 | 4.29 |
| $V_1$ (%-microns$^2$) | 6.23 | 6.43 | 6.08 | 6.29 | 5.82 |
| Alpha | 10.07 | 10.28 | 11.32 | 10.85 | 9.81 |
| $\Delta_2$ (%) | 0 | 0 | 0 | 0 | 0 |
| $\Delta_3$ (%) | −0.443 | −0.394 | −0.383 | −0.417 | −0.292 |
| $r_2$ | 9.04 | 9.38 | 10.47 | 10.19 | 10.64 |
| $r_3$ | 14.71 | 14.90 | 15.88 | 16.28 | 17.83 |
| $V_3$ (%-microns$^2$) | −59.7 | −52.8 | −54.6 | −67.1 | −59.8 |
| MFD at 1310 nm (microns) | 8.45 | 8.50 | 8.52 | 8.59 | 8.61 |
| MFD at 1550 nm (microns) | 9.43 | 9.49 | 9.61 | 9.65 | 9.76 |
| Dispersion at 1310 nm (ps/nm/km) | 0.56 | 0.51 | −0.18 | 0.22 | −0.47 |
| Dispersion Slope at 1310 nm (ps/nm$^2$/km) | 0.090 | 0.090 | 0.088 | 0.089 | 0.088 |
| Zero Dispersion Wavelength (nm) | 1304 | 1304 | 1312 | 1307 | 1315 |
| Theoretical Cutoff Wavelength (nm) | 1245 | 1269 | 1248 | 1264 | 1224 |
| Fiber Cutoff Wavelength (nm) | 1240 | 1260 | 1240 | 1260 | 1220 |
| Bend Loss at 1550 nm for 10 mm diameter mandrel (dB/turn) | 0.049 | 0.072 | 0.082 | 0.03 | 0.078 |

TABLE 1C

|  | Fiber 6 | Fiber 7 | Fiber 8 | Fiber 9 | Fiber 10 |
|---|---|---|---|---|---|
| $\Delta_{IMAX}$ (%) | 0.371 | 0.382 | 0.368 | 0.352 | 0.334 |
| $r_1$ | 4.37 | 4.70 | 4.51 | 4.51 | 4.57 |
| $V_1$ (%-microns$^2$) | 5.94 | 6.71 | 6.23 | 5.98 | 5.89 |
| Alpha | 10.48 | 7.74 | 9.97 | 10.07 | 11.00 |
| $\Delta_2$ (%) | 0 | 0 | 0 | 0 | 0 |
| $\Delta_3$ (%) | −0.375 | −0.385 | −0.333 | −0.360 | −0.365 |
| $r_2$ | 9.61 | 11.02 | 9.98 | 9.93 | 10.19 |
| $r_3$ | 14.28 | 15.13 | 15.27 | 14.59 | 14.62 |
| $V_3$ (%-microns$^2$) | −41.8 | −41.4 | −44.5 | −41.2 | −40.1 |
| MFD at 1310 nm (microns) | 8.71 | 8.83 | 8.84 | 8.96 | 9.17 |
| MFD at 1550 nm (microns) | 9.77 | 9.91 | 9.91 | 10.05 | 10.29 |
| Dispersion at 1310 nm (ps/nm/km) | 0.28 | 0.46 | 0.46 | 0.47 | 0.59 |
| Dispersion Slope at 1310 nm (ps/nm$^2$/km) | 0.090 | 0.089 | 0.089 | 0.090 | 0.090 |
| Zero Dispersion Wavelength (nm) | 1307 | 1305 | 1305 | 1305 | 1303 |
| Theoretical Cutoff Wavelength (nm) | 1224 | 1305 | 1254 | 1228 | 1219 |
| Fiber Cutoff Wavelength (nm) | 1210 | 1280 | 1240 | 1210 | 1200 |
| Bend Loss at 1550 nm for 10 mm diameter mandrel (dB/turn) | 0.32 | 0.2 | 0.234 | 0.446 | 0.672 |

Table 1D below provides some exemplary embodiments of the optical fibers that have an outer cladding diameter between 60 and 65 microns (i.e., 30<$r_4$<32.5 microns), primary coating diameter ($2r_5$) between 85 and 110 microns, an outer coating diameter ($2r_6$) of 135 microns or less, low attenuation and excellent bending performance. Table 1D fibers have: primary coating in situ modulus of ≤0.35 MPa, primary coating thickness $t_P$ such that 10 microns≤$t_P$≤25 microns; primary coating spring constant $\chi_P$≤1.6 MPa (e.g., $\chi_P$≤1.2 MPa, $\chi_P$≤1.0 MPa, or even $\chi_P$≤0.8 MPa), secondary coating diameter in the range between about 110 and 135 microns, a secondary coating situ modulus $t_S$≥1200 MPa, and a secondary coating thickness $t_S$ such that 10 microns≤$t_S$≤20 microns. The tertiary coating thickness in these embodiments is between 0 and 6 microns (i.e., in some embodiments there is no tertiary coating, thus the tertiary coating thickness $t_T$=0). Other fiber embodiments contain a tertiary coating with a thickness $t_T$ between 2 and 6 microns. In the exemplary embodiments fibers of Table 1D the sum ($t_S+t_T$) is between 10 microns and 30 microns, i.e., 10 microns≤($t_S+t_T$)≤30 microns. In some of these embodiments, the puncture resistance load of the optical fiber is greater than 20 grams. In some embodiments, the puncture resistance load of the optical fiber is greater than 25 grams. In some embodiments, the puncture resistance load of the optical fiber is greater than 30 grams. The combined cross-sectional areas of the secondary and optional tertiary coating layers for the embodiments of fibers disclosed in Table 1D are greater than 17000 sq. microns, which further improves the puncture resistance. An exemplary refractive core-cladding index profile of such fibers is shown schematically in FIG. 3. The exemplary refractive index profile parameters and modelled attributes of several exemplary embodiments corresponding to FIG. 3 are given in Tables 1B and 1C. The fibers embodiments of Tables 1B and 1C (Fiber 1-Fiber 10) can be constructed, for example, with an outer cladding diameter $2R_4$ of about 62-63 microns as described in Table D when be utilized with primary and secondary coatings of Table 1D. In some exemplary embodiment of Fibers 1-Fibers 10 is $\Delta_4$ (%)=0, $2R_4$ of about 60-65 microns, and the outer cladding is made of pure silica. In other exemplary embodiments of Fibers 1-Fibers 10, $2R_4$ has a value of about 60-65 microns and the outer cladding can be up doped or down doped relative to pure silica, but $\Delta_4 > \Delta_{3MIN}$.

TABLE 1D

| Parameter | Example 6 | Example 7 | Example 8 | Example 9 | Example 10 |
|---|---|---|---|---|---|
| Outer Cladding Diameter ($2r_4$, microns) | 62.5 | 63 | 62.5 | 62.5 | 63 |
| Primary Coating in situ Modulus ($E_P$, MPa) | 0.26 | 0.3 | 0.2 | 0.2 | 0.2 |
| Primary Coating Thickness ($t_P$, microns) | 18 | 20 | 15 | 19.75 | 13 |
| Primary Coating Diameter (microns) | 98.5 | 103 | 92.5 | 102 | 89 |
| Primary Coating Spring Constant ($\chi_P$, MPa) | 0.90 | 0.95 | 0.83 | 0.63 | 0.97 |
| Secondary Coating Thickness ($t_S$, microns) | 18.25 | 13.5 | 9.75 | 12.5 | 11.5 |
| Secondary Coating Diameter (microns) | 135 | 130 | 112 | 127 | 112 |
| Secondary Coating in situ Modulus (MPa) | 1800 | 1300 | 1600 | 2000 | 1900 |
| Tertiary Coating Thickness (microns) | 0 | 0 | 4 | 4 | 4 |
| Secondary + Tertiary Coating Thickness ($t_S + t_T$, microns) | 18.25 | 13.5 | 13.75 | 16.5 | 15.5 |
| Ratio of Primary Coating Thickness to (Secondary + Tertiary) Coating Thickness [$t_P/(t_S + t_T)$] | 0.99 | 1.48 | 1.09 | 1.20 | 0.84 |
| Secondary + Tertiary Coating Cross Sectional Area (sq. microns) | 26775 | 19764 | 18359 | 24570 | 20354 |
| Coated Fiber Diameter ($2r_6$, microns) | 135 | 130 | 120 | 135 | 120 |

Table 1E below provides five exemplary embodiments of the optical fibers that have an outer cladding diameter between about 45 microns and 55 microns, for example, between 48 microns to 52 microns, (i.e., 22.5 microns≤$r_4$≤27.5 microns, or 24 microns≤$r_4$≤26 microns), an outer coating diameter ($2r_6$) of 130 microns or less, low attenuation and excellent bending performance. Table 1E fibers have: primary coating in situ elastic modulus of ≤0.35 MPa, primary coating thickness $t_P$ such that 10 microns≤$t_P$≤25 microns; primary coating spring constant $\chi_P$≤1.6 MPa (e.g., $\chi_P$≤1.2 MPa, $\chi_P$≤1.0 MPa and even $\chi_P$≤0.8 MPa), a secondary coating diameter of about 100-125 microns, a secondary coating situ modulus $t_S$≥1200 MPa, and a secondary coating thickness $t_S$ such that 10 microns≤$t_S$≤20 microns. The tertiary coating thickness $t_T$ in these embodiments is 0-6 microns (i.e., in some embodiments there is no tertiary coating, thus tertiary coating thickness $t_T$=0). Other fiber embodiments contain a tertiary coating with a thickness $t_T$ between 2 and 6 microns. In the exemplary embodiments fibers of Table 1E, the sum ($t_S$+$t_T$) is between 10 microns and 20 microns, i.e., 10 microns≤ ($t_S$+$t_P$)≤20 microns. In some of these embodiments, the puncture resistance load of the optical fiber is greater than 20 grams. In some embodiments, the puncture resistance load of the optical fiber is greater than 25 grams. In some embodiments, the puncture resistance load of the optical fiber is greater than 30 grams. The combined cross-sectional areas of the secondary and optional tertiary coating layers for the embodiments of fibers disclosed in Table 1E are greater than 17000 sq. microns, which further improves the puncture resistance.

TABLE 1E

| Parameter | Example 11 | Example 12 | Example 13 | Example 14 | Example 15 |
|---|---|---|---|---|---|
| Outer Cladding Diameter ($2r_4$, microns) | 50 | 50.5 | 50 | 50 | 50.5 |
| Primary Coating in situ Modulus ($E_P$, MPa) | 0.26 | 0.3 | 0.2 | 0.2 | 0.2 |
| Primary Coating Thickness ($t_P$, microns) | 20 | 20 | 15 | 22.5 | 12.5 |
| Primary Coating Diameter (microns) | 90 | 90.5 | 80 | 95 | 75.5 |
| Primary Coating Spring Constant ($\chi_P$, MPa) | 0.65 | 0.76 | 0.67 | 0.44 | 0.81 |
| Secondary Coating Thickness ($t_S$, microns) | 17.5 | 14.75 | 11 | 13.5 | 13.25 |
| Secondary Coating Diameter (microns) | 125 | 120 | 102 | 122 | 102 |
| Secondary Coating in situ Modulus (MPa) | 1650 | 1500 | 1350 | 1500 | 1700 |
| Tertiary Coating Thickness (microns) | 0 | 0 | 4 | 4 | 4 |
| Secondary + Tertiary Coating Thickness ($t_S$ + $t_T$, microns) | 17.5 | 14.75 | 15 | 17.5 | 17.25 |
| Ratio of Primary Coating Thickness to (Secondary + Tertiary) Coating Thickness [$t_P/(t_S = t_T)$] | 1.14 | 1.36 | 1.00 | 1.29 | 0.72 |
| Secondary + Tertiary Coating Cross Sectional Area (sq. microns) | 23640 | 19509 | 17907 | 24740 | 20105 |
| Coated Fiber Diameter ($2r_6$, microns) | 125 | 120 | 110 | 130 | 110 |

The primary coatings of the optical fiber embodiments of Tables 1A, 1D, and 1E have in situ moduli of elasticity less than 0.35 MPa, for example less than 0.2 MPa and even more preferably less than 0.15 MPa, with glass transition temperatures between −25° C. and −35° C. The optical fibers are bend insensitive—i.e., the optical fiber profiles disclosed herein when used in combination with the low modulus primary coatings result in excellent macrobend and microbend properties. This facilitates the use of thinner primary coating layers, in conjunction with sufficiently thick secondary coatings to achieve acceptable puncture resistance for these applications when the secondary coating has an in situ elastic modulus greater than 1200 MPa, preferably greater than 1500 MPa, more preferably greater than 1700 MPa, and even more preferably greater than 1800 MPa. The fibers exhibit a wire mesh drum microbending attenuation at 1550 nm less than 1.0 dB/km, or in some embodiments less than 0.5 dB/km, with the coated fiber advantageously exhibiting a puncture resistance load greater than 30 grams.

The fibers embodiments of Tables 1B and 1C (Fiber 1-Fiber 10) can be constructed, for example, with an outer cladding diameter $2R_4$ of about 45-55 microns, or as described above or shown in Table 1E, when be utilized with primary and secondary coatings of Table 1E. In some of these exemplary embodiment of Fibers 1-Fibers 10 is $\Delta_4$ (%)=0, and the outer cladding is made of pure silica. In other exemplary embodiments of Fibers 1-Fibers 10 the outer cladding can be updoped or down doped relative to pure silica, but $\Delta_4$>$\Delta_{3MIN}$.

Figure 4:
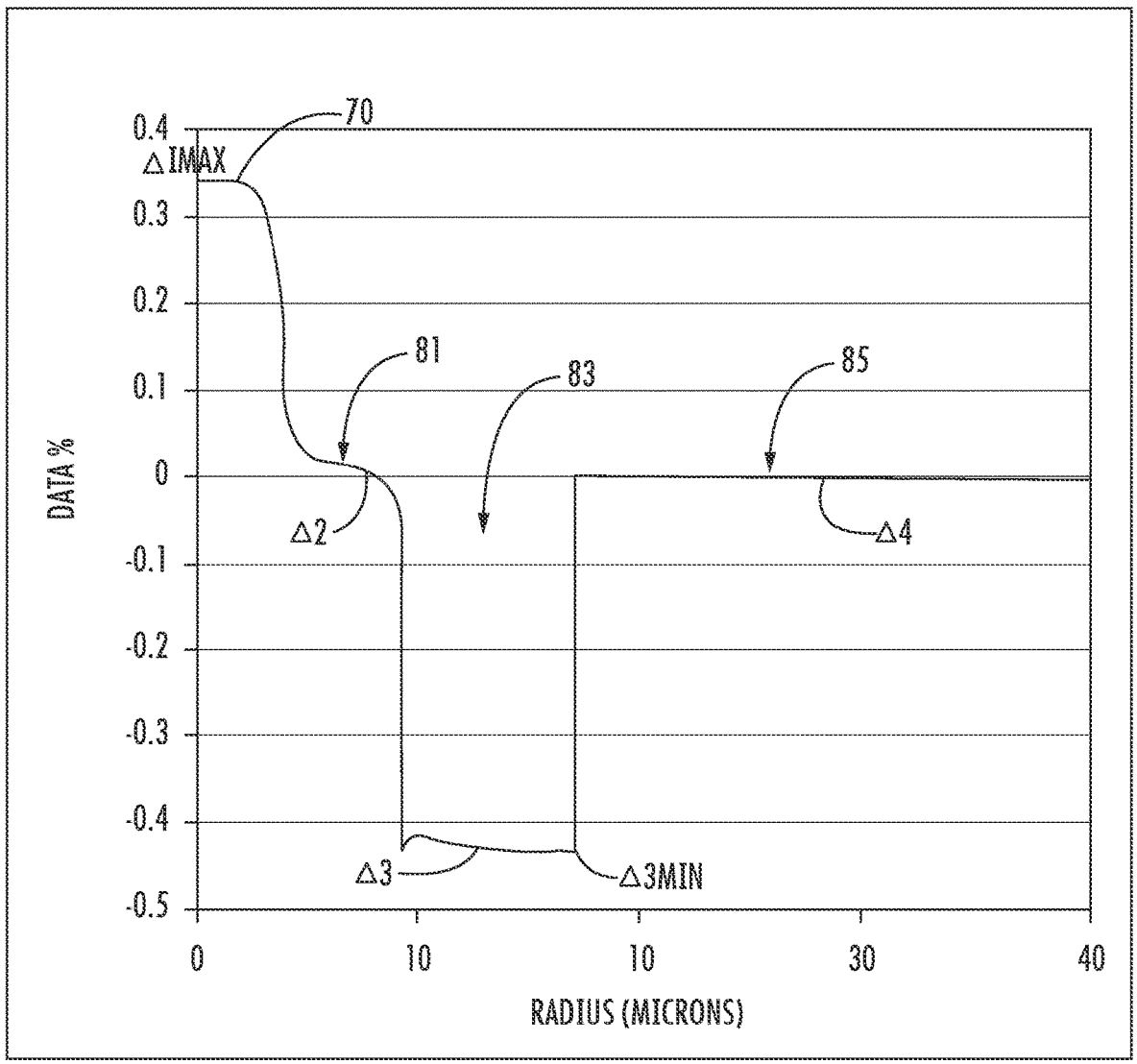
FIG. 4 is an illustrative modeled refractive index core-cladding refractive index profile according to one exemplary embodiments of the optical fiber that has a cross-section corresponding to FIG. 2.

As described above, two exemplary embodiments of refractive index profiles for the core and cladding are presented in FIGS. 3 and 4.

More specifically, FIG. 3 is a schematic illustration of one embodiment of optical fiber's refractive index profile. More specifically, FIG. 3 shows a refractive index profile, expressed in Δ % relative to pure silica glass, for a fiber 60 having a core 70 with outer radius $r_1$ and relative refractive index $\Delta_1$, and a cladding 80 having a first inner cladding region 81 extending from radial position $r_1$ to radial position $r_2$ and having relative refractive index $\Delta_2$, a second inner cladding region 83 extending from radial position $r_2$ to radial position $r_3$ and having relative refractive index $\Delta_3$, and an outer cladding region 85 extending from radial position $r_3$ to radial position $r_4$ and having relative refractive index $\Delta_4$. In the profile of FIG. 3, the second inner cladding region 83 may be referred to herein as a rectangular trench and may have a constant refractive index that is less than the refractive indices of the first inner cladding region 81 and the outer cladding region 85. The trench shown in FIG. 3, for example, may be established by incorporating Fluorine as a downdopant, to provide relative refractive index $\Delta_{3MIN}$. The core 70 may have the highest refractive index in the profile. The core 70 may include a lower index region at or near the centerline (known in the art as a "centerline dip"). The core refractive index profile may be or may approximate a Gaussian profile, may be an a profile, may be a step index profile, or may be a rounded step index profile. The coated fiber 60 of FIG. 3 includes a primary coating 40 and a secondary coating 50 (not shown in FIG. 3).

FIG. 4 shows a modelled refractive index profile, also expressed in Δ % relative to pure silica glass, for a fiber 60 having a core 70 with outer radius $r_1$ and relative refractive index $\Delta_1$, and a cladding 80 having a first inner cladding region 81 extending from radial position $r_1$ to radial position $r_2$ and having relative refractive index $\Delta_2$, a second inner cladding region 83 extending from radial position $r_2$ to radial position $r_3$ and having relative refractive index $\Delta_3$, and an outer cladding region 85 extending from radial position $r_3$ to radial position $r_4$ and having relative refractive index $\Delta_4$. In the profile of FIG. 4, the second inner cladding region 83 may be referred to herein as a rectangular trench and may have a constant refractive index that is less than the refractive indices of the first inner cladding region 81 and the outer cladding region 85. The trench shown in FIG. 4, for example, may be established by incorporating Fluorine as a downdopant, to provide relative refractive index $\Delta_{3MIN}$. In this embodiment the core 70 has have highest refractive index in the core-cladding profile. The core 70 may include a lower index region at or near the centerline (known in the art as a "centerline dip"). The coated fiber 60 of FIG. 4 includes a primary coating 40 and a secondary coating 50 (not shown in FIG. 4).

The refractive index profiles of the core and cladding may be achieved through control of the spatial distribution of dopants or modifiers in silica or silica-based glass. Updopants (e.g. $GeO_2$, $Al_2O_3$, $P_2O_5$, $TiO_2$, Cl, Br) may be used to create regions of increased refractive index and downdopants (e.g. F, $B_2O_3$, non-periodic voids) may be used to create regions of decreased refractive index. Regions of constant refractive index may be formed by not doping or by doping at a uniform concentration. Regions of variable refractive index may be formed through non-uniform spatial distributions of dopants. The core 70 may be updoped substantially with $GeO_2$, resulting in a refractive index delta (due to $GeO_2$) relative to pure silica given by $Delta_{Ge}\%=0.0601*wt.\% GeO_2$. The second inner cladding region 83 may be downdoped substantially with Fluorine, resulting in a refractive index delta (due to F) relative to pure silica given by $Delta_F\%=-0.3053*wt.\% F$.

The coated fiber may include regions interposed between the core 70 and first inner cladding region 81, or between the first inner cladding region 81 and the second inner cladding region 83, or between the second inner cladding region 83 and the outer cladding region 85, or between the outer cladding region 85 and the primary coating 90, or between the primary coating 90 and the secondary coating 100. The optical fiber may have a core 20, 70 with an outer radius $r_1$ and a relative refractive index $\Delta_1$ with a maximum value $\Delta_{1MAX}$ and a minimum value $\Delta_{1MIN}$, and a cladding 30, 60. The cladding may comprise a first inner cladding region having an outer radius $r_2$ and having relative refractive index $\Delta_2$ with a maximum value $\Delta_{2MAX}$ and a minimum value $\Delta_{2MIN}$, a second inner cladding region having an outer radius $r_3$ and having relative refractive index $\Delta_3$ with a maximum value $\Delta_{3MAX}$ and a minimum value $\Delta_{3MIN}$, an outer cladding region having an outer radius $r_4$ and having relative refractive index $\Delta_4$ with a maximum value $\Delta_{4MAX}$ and a minimum value $\Delta_{4MIN}$. The optical fiber comprises a primary coating having outer radius $r_5$, and a secondary coating having outer radius $r_6$, where $r_6>r_5>r_4>r_3>r_2>r_1$.

The core and cladding of the present coated fibers may be produced in a single-step operation or multi-step operation by methods which are well known in the art. Suitable methods include: the double crucible method, rod-in-tube procedures, and doped silica deposition processes, also commonly referred to as chemical vapor deposition ("CVD") or vapor phase oxidation. A variety of CVD processes are known and are suitable for producing the core and cladding layer used in the coated optical fibers of the present invention. They include external CVD processes, axial vapor deposition processes, modified CVD (MCVD), inside vapor deposition, and plasma-enhanced CVD (PECVD).

The glass portion of the coated fibers may be drawn from a specially prepared, cylindrical preform which has been locally and symmetrically heated to a temperature sufficient to soften the glass, e.g., a temperature of about 2000° C. for a silica glass. As the preform is heated, such as by feeding the preform into and through a furnace, a glass fiber is drawn from the molten material. See, for example, U.S. Pat. Nos. 7,565,820; 5,410,567; 7,832,675; and 6,027,062; the disclosures of which are incorporated by reference herein in their entirety, for further details about fiber making processes.

The primary coating may have a lower modulus than the secondary coating. The primary coating may be formed from a primary composition that includes a curable oligomer. The curable primary composition may also include monomers, a polymerization initiator, and one or more additives. Unless otherwise specified or implied herein, the weight percent (wt %) of a particular component in a curable primary composition refers to the amount of the component present in the curable primary composition on an additive-free basis. Generally, the weight percentages of the monomer(s), oligomer(s), and initiator(s) sum to 100%. When present, the amount of an additive is reported herein in units of parts per hundred (pph) relative to the combined amounts of monomer(s), oligomer(s), and initiator(s). An additive present at the 1 pph level, for example, is present in an amount of 1 g for every 100 g of combined monomer(s), oligomer(s), and initiator(s).

The oligomer of the curable primary composition may be a urethane acrylate oligomer, or a urethane acrylate oligomer that includes one or more urethane groups, or a urethane acrylate oligomer that includes one or more aliphatic urethane groups, or a urethane acrylate oligomer that includes a single urethane group, or a urethane acrylate oligomer that includes a single aliphatic urethane group. The urethane group may be formed from a reaction between an isocyanate group and an alcohol group.

The oligomer may be an acrylate-terminated oligomer. Preferred acrylate-terminated oligomers for use in the primary curable compositions include BR3731, BR3741, BR582 and KWS4131, from Dymax Oligomers & Coatings; polyether urethane acrylate oligomers (e.g., CN986, available from Sartomer Company); polyester urethane acrylate oligomers (e.g., CN966 and CN973, available from Sartomer Company, and BR7432, available from Dymax Oligomers & Coatings); polyether acrylate oligomers (e.g., GENOMER 3456, available from Rahn AG); and polyester acrylate oligomers (e.g., EBECRYL 80, 584 and 657, available from Cytec Industries Inc.). Other oligomers are described in U.S. Pat. Nos. 4,609,718; 4,629,287; and 4,798,852, the disclosures of which are hereby incorporated by reference in their entirety herein.

The oligomer of the primary curable composition may include a soft block with a number average molecular weight (Ms) of about 4000 g/mol or greater. Examples of such oligomers are described in U.S. patent application Ser. No. 09/916,536, the disclosure of which is incorporated by reference herein in its entirety. The oligomers may have flexible backbones, low polydispersities, and/or may provide cured coatings of low crosslink densities.

The oligomers may be used singly, or in combination to control coating properties. The total oligomer content of the primary curable composition may be between about 5 wt % and about 95 wt %, or between about 25 wt % and about 65 wt %, or between about 35 wt % and about 55 wt %.

The monomer component of the primary curable composition may be selected to be compatible with the oligomer, to provide a low viscosity formulation, and/or to increase the refractive index of the primary coating. The monomer may also be selected to provide curable compositions having decreased gel times and low moduli. The primary curable composition may include a single monomer or a combination of monomers. The monomers may include ethylenically-unsaturated compounds, ethoxylated acrylates, ethoxylated alkylphenol monoacrylates, propylene oxide acrylates, n-propylene oxide acrylates, isopropylene oxide acrylates, monofunctional acrylates, monofunctional aliphatic epoxy acrylates, multifunctional acrylates, multifunctional aliphatic epoxy acrylates, and combinations thereof. The monomer component may include compounds having the general formula $R_2$—$R_1$—O—$(CH_2CH_3CH$—$O)_n$—COCH=$CH_2$, where $R_1$ and $R_2$ are aliphatic, aromatic, or a mixture of both, and n=1 to 10, or $R_1$-O—$(CH_2CH_3CH$—$O)_n$—COCH=$CH_2$, where $R_1$ is aliphatic or aromatic, and n=1 to 10. Representative examples include ethylenically unsaturated monomers such as lauryl acrylate (e.g., SR335 available from Sartomer Company, Inc., AGEFLEX FA12 available from BASF, and PHOTOMER 4812 available from IGM Resins), ethoxylated nonylphenol acrylate (e.g., SR504 available from Sartomer Company, Inc. and PHOTOMER 4066 available from IGM Resins), caprolactone acrylate (e.g., SR495 available from Sartomer Company, Inc., and TONE M-100 available from Dow Chemical), phenoxyethyl acrylate (e.g., SR339 available from Sartomer Company, Inc., AGEFLEX PEA available from BASF, and PHOTOMER 4035 available from IGM Resins), isooctyl acrylate (e.g., SR440 available from Sartomer Company, Inc. and AGEFLEX FA8 available from BASF), tridecyl acrylate (e.g., SR489 available from Sartomer Company, Inc.), isobornyl acrylate (e.g., SR506 available from Sartomer Company, Inc. and AGEFLEX IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and AGEFLEX FA10 available from BASF), 2-(2-ethoxyethoxy)ethyl acrylate (e.g., SR256 available from Sartomer Company, Inc.), epoxy acrylate (e.g., CN120, available from Sartomer Company, and EBECRYL 3201 and 3604, available from Cytec Industries Inc.), lauryloxyglycidyl acrylate (e.g., CN130 available from Sartomer Company) and phenoxyglycidyl acrylate (e.g., CN131 available from Sartomer Company) and combinations thereof.

The monomer component of the primary curable composition may also include a multifunctional (meth)acrylate. As used herein, the term "(meth)acrylate" means acrylate or methacrylate. Multifunctional (meth)acrylates are (meth)acrylates having two or more polymerizable (meth)acrylate moieties per molecule. The multifunctional (meth)acrylate may have three or more polymerizable (meth)acrylate moieties per molecule. Examples of multifunctional (meth)acrylates include dipentaerythritol monohydroxy pentaacrylate (e.g., PHOTOMER 4399 available from IGM Resins); methylolpropane polyacrylates with and without alkoxylation such as trimethylolpropane triacrylate, ditrimethylolpropane tetraacrylate (e.g., PHOTOMER 4355, IGM Resins); alkoxylated glyceryl triacrylates such as propoxylated glyceryl triacrylate with propoxylation being 3 or greater (e.g., PHOTOMER 4096, IGM Resins); and erythritol polyacrylates with and without alkoxylation, such as pentaerythritol tetraacrylate (e.g., SR295, available from Sartomer Company, Inc. (Westchester, Pa.)), ethoxylated pentaerythritol tetraacrylate (e.g., SR494, Sartomer Company, Inc.), dipentaerythritol pentaacrylate (e.g., PHOTOMER 4399, IGM Resins, and SR399, Sartomer Company, Inc.), tripropyleneglycol di(meth)acrylate, propoxylated hexanediol di(meth)acrylate, tetrapropyleneglycol di(meth)acrylate, pentapropyleneglycol di(meth)acrylate. A multifunctional (meth)acrylate may be present in the primary curable composition at a concentration of from 0.05 wt % to 15 wt %, or from 0.1 wt % to 10 wt %.

The monomer component of the primary curable compositions may include an N-vinyl amide such as an N-vinyl lactam, or N-vinyl pyrrolidinone, or N-vinyl caprolactam. The N-vinyl amide monomer may be present in the primary curable composition at a concentration from 0.1-40 wt %, or from 2-10 wt %.

The curable primary coating composition may include one or more monofunctional (meth)acrylate monomers in an amount from 5-95 wt %, or from 30-75 wt %, or from 40-65 wt %. The curable primary coating composition may include one or more monofunctional aliphatic epoxy acrylate monomers in an amount from 5-40 wt %, or from 10-30 wt %.

The monomer component of the primary curable composition may include a hydroxyfunctional monomer. A hydroxyfunctional monomer is a monomer that has a pendant hydroxy moiety in addition to other reactive functionality such as (meth)acrylate. Examples of hydroxyfunctional monomers including pendant hydroxyl groups include caprolactone acrylate (available from Dow Chemical as TONE M-100); poly(alkylene glycol) mono(meth)acrylates, such as poly(ethylene glycol) monoacrylate, poly(propylene glycol) monoacrylate, and poly(tetramethylene glycol) monoacrylate (each available from Monomer, Polymer & Dajac Labs); 2-hydroxyethyl (meth)acrylate, 3-hydroxypropyl (meth)acrylate, and 4-hydroxybutyl (meth)acrylate (each available from Aldrich).

The hydroxyfunctional monomer may be present in an amount sufficient to improve adhesion of the primary coating to the optical fiber. The hydroxyfunctional monomer may be present in the primary curable composition in an amount between about 0.1 wt % and about 25 wt %, or in an amount between about 5 wt % and about 8 wt %. The use of the hydroxyfunctional monomer may decrease the amount of adhesion promoter necessary for adequate adhesion of the primary coating to the optical fiber. The use of the hydroxyfunctional monomer may also tend to increase the hydrophilicity of the primary coating. Hydroxyfunctional monomers are described in more detail in U.S. Pat. No. 6,563,996, the disclosure of which is hereby incorporated by reference in its entirety.

The total monomer content of the primary curable composition may be between about 5 wt % and about 95 wt %, or between about 30 wt % and about 75 wt %, or between about 40 wt % and about 65 wt %.

The monomer present in the primary curable composition may include an N-vinyl amide monomer at a concentration of 0.1 to 40 wt % or 2 to 10 wt % in combination with one or more difunctional urethane acrylate oligomers in an amount from 5 to 95 wt %, or from 25 to 65 wt % or from 35 to 55 wt %.

The primary coating composition may include one or more monofunctional (meth)acrylate monomers in an amount of from about 5 to 95 wt %; an N-vinyl amide monomer in an amount of from about 0.1 to 40 wt %; and one or more difunctional urethane acrylate oligomers that include a polyol reacted with an isocyanate to form a urethane, where the oligomer is present in an amount of from about 5 to 95 wt %. The polyol may be a polypropylene glycol and the isocyanate may be an aliphatic diisocyanate.

The primary coating composition may include one or more monofunctional (meth)acrylate monomers in an amount of from about 40 to 65% by weight; an N-vinyl amide monomer in an amount of from about 2 to 10% by weight; and one or more polypropylene glycol-based difunctional urethane acrylate oligomers in an amount of from about 35 to 60% by weight.

The glass transition temperature of the primary coating may influence the microbend performance of the fibers at low temperature. It may be desirable for the primary coating to have a glass transition temperature below the lowest projected use temperature of the coated optical fiber. The glass transition temperature of the primary coating may be −15° C. or less, or −25° C. or less, or −30° C. or less, or −40° C. or less. The glass transition temperature of the primary coating may be greater than −60° C., or greater than −50° C., or greater than −40° C. The glass transition temperature of the primary coating may be or between −60° C. and −15° C., or between −60° C. and −30° C., or between −60° C. and −40° C., or between −50° C. and −15° C., or between −50° C. and −30° C., or between −50° C. and −40° C.

The primary coating may have a lower modulus of elasticity than the secondary coating. A low modulus may allow the primary coating to protect the core and cladding by efficiently dissipating internal stresses that arise when the exterior of the optical fiber is bent or subjected to an external force. As used herein, in situ modulus of the primary coating is the modulus measured by the technique described below.

Primary In Situ Modulus

A six-inch fiber sample is used for the measurement of the in situ modulus of the primary coating. A one-inch section from the center of the six-inch sample is window stripped and wiped with isopropyl alcohol. The sample is mounted on a sample holder/alignment stage equipped with 10 mm×5 mm aluminum tabs to which the sample is glued. The two tabs are set so that the 10 mm length is laid horizontally with a 5 mm gap between two tabs. The optical fiber is laid horizontally on the sample holder across the tabs. The coated end of the optical fiber is positioned on one tab and extended halfway into the 5 mm space between the tabs and the stripped glass is positioned over the other half of the 5 mm gap and on the other tab. The sample is lined up and then moved out of the way so that a small dot of glue can be applied to the half of each tab closest to the 5 mm gap. The optical fiber is then brought back over the tabs and centered. The alignment stage is then raised until the glue just touches the fiber. The coated end is then pulled through the glue such that the majority of the sample in the 5 mm gap between the tabs is stripped glass. The very tip of the coated end is left extended beyond the glue on the tab so that the region to be measured is left exposed. The sample is left to dry. The length of fiber fixed to the tabs is trimmed to 5 mm. The coated length embedded in glue, the non-embedded length (between the tabs), and the end-face primary diameter are measured.

Measurements can be performed on an instrument such as a Rheometrics DMTA IV at a constant strain of $9e^{-6}$ Hz for a time of forty-five minutes at room temperature (~21° C.). The gauge length is 15 mm. Force and the change in length are recorded and used for the calculation of primary modulus. Samples are prepared by removing any epoxy from the tabs that would interfere with the 15 mm clamping length to insure there is no contact with the optical fiber and that the sample is secured squarely to the clamps. Once the instrument force is zeroed out, the non-coated end is mounted to the lower clamp (measurement probe). The tab containing the coated end of the optical fiber is mounted to the upper (fixed) clamp. The test is then executed and the sample is removed once the analysis is complete.

The in situ modulus of the primary coating may be 0.30 MPa or less, or 0.25 MPa or less, or 0.20 MPa or less, or 0.19 MPa or less, or 0.18 MPa or less, or 0.17 MPa or less, or 0.16 MPa or less, or 0.15 MPa or less, or between 0.01 MPa and 0.35 MPa, or between 0.01 MPa and 0.30 MPa, or between 0.01 MPa and 0.20 MPa.

The primary curable composition may also include polymerization initiators, antioxidants, and other additives familiar to the skilled artisan.

The polymerization initiator may facilitate initiation of the polymerization process associated with the curing of the primary composition to form the primary coating. Polymerization initiators may include thermal initiators, chemical initiators, electron beam initiators, and photoinitiators. For many (meth)acrylate-based coating formulations, photoinitiators such as ketonic photoinitiating additives and/or phosphine oxide additives may be employed. When used in the photoformation of the primary coating of the present disclosure, the photoinitiator may be present in an amount sufficient to provide rapid ultraviolet curing.

Suitable photoinitiators may include 1-hydroxycyclohexylphenyl ketone (e.g., IRGACURE 184 available from BASF)); bis(2,6-dimethoxybenzoyl)-2,4,4-trimethylpentylphosphine oxide (e.g., commercial blends IRGACURE 1800, 1850, and 1700 available from BASF); 2,2-dimethoxy-2-phenylacetophenone (e.g., IRGACURE 651, available from BASF); bis(2,4,6-trimethylbenzoyl)-phenylphosphine oxide (IRGACURE 819); (2,4,6-trimethylbenzoyl) diphenyl phosphine oxide (LUCIRIN TPO, available from BASF (Munich, Germany)); ethoxy(2,4,6-trimethylbenzoyl)-phenylphosphine oxide (LUCIRIN TPO-L from BASF); and combinations thereof.

The photoinitiator component of the primary curable composition may consist of a single photoinitiator or a combination of two or more photoinitiators. The total photoinitiator content of the primary curable composition may be up to about 10 wt %, or between about 0.5 wt % and about 6 wt %.

In addition to monomer(s), oligomer(s), and polymerization initiator(s), the primary curable composition may include other additives such as an adhesion promoter, a strength additive, a reactive diluent, an antioxidant, a catalyst, a stabilizer, an optical brightener, a property-enhancing additive, an amine synergist, a wax, a lubricant, and/or a slip agent. Some additives may operate to control the polymerization process, thereby affecting the physical properties (e.g., modulus, glass transition temperature) of the polymerization product formed from the primary curable composition. Other additives may affect the integrity of the polymerization product of the primary curable composition (e.g., protect against de-polymerization or oxidative degradation). For example, the primary curable composition may include a carrier, as described in U.S. Pat. Nos. 6,326,416 and 6,539,152, the disclosures of which are hereby incorporated by reference herein.

It may be desirable to include an adhesion promoter in the primary curable composition. An adhesion promoter is a compound that may facilitate adhesion of the primary coating and/or primary composition to the cladding. Suitable adhesion promoters include alkoxysilanes, organotitanates, and zirconates. Representative adhesion promoters include 3-mercaptopropyl-trialkoxysilane (e.g., 3-MPTMS, available from Gelest (Tullytown, Pa.)); bis(trialkoxysilyl-ethyl) benzene; acryloxypropyltrialkoxysilane (e.g., (3-acryloxypropyl)-trimethoxysilane, available from Gelest), methacryloxypropyltrialkoxysilane, vinyltrialkoxysilane, bis(trialkoxysilylethyl)hexane, allyltrialkoxysilane, styrylethyltrialkoxysilane, and bis(trimethoxysilylethyl)benzene (available from United Chemical Technologies (Bristol, Pa.)); see U.S. Pat. No. 6,316,516, the disclosure of which is hereby incorporated by reference in its entirety herein.

The adhesion promoter may be present in the primary composition in an amount between about 0.02 pph to about 10 pph, or between about 0.05 pph and 4 pph, or between about 0.1 pph to about 2 pph, or between about 0.1 pph to about 1 pph.

The primary coating composition may also include a strength additive, as described in U.S. Published Patent Application No. 20030077059, the disclosure of which is hereby incorporated by reference herein in its entirety. Representative strength additives include mercapto-functional compounds, such as N-(tert-butoxycarbonyl)-L-cysteine methyl ester, pentaerythritol tetrakis(3-mercaptopropionate), (3-mercaptopropyl)-trimethoxysilane; (3-mercaptopropyl) trimethoxysilane, and dodecyl mercaptan. The strength additive may be present in the primary curable composition in an amount less than about 1 pph, or in an amount less than about 0.5 pph, or in an amount between about 0.01 pph and about 0.1 pph.

A representative antioxidant is thiodiethylene bis[3-(3,5-di-tert-butyl)-4-hydroxy-phenyl) propionate] (e.g., IRGANOX 1035, available from BASF).

It may be desirable to include an optical brightener in the primary curable composition. Representative optical brighteners include TINOPAL OB (available from BASF); Blankophor KLA (available from Bayer); bisbenzoxazole compounds; phenylcoumarin compounds; and bis(styryl) biphenyl compounds. The optical brightener may be present in the primary curable composition at a concentration of 0.005 pph-0.3 pph.

It may also be desirable to include an amine synergist in the primary curable composition. Representative amine synergists include triethanolamine; 1,4-diazabicyclo[2.2.2]octane (DABCO), triethylamine, and methyldiethanolamine. The amine synergist may be present at a concentration of 0.02 pph-0.5 pph.

The secondary coating may protect the optical fiber from mechanical damage and the external environment. The secondary coating may be formed from a curable secondary composition that includes one or more monomers. The monomers may include ethylenically unsaturated compounds. The curable secondary composition may also include one or more oligomers, one or more polymerization initiators, and one or more additives as described more fully herein.

Unless otherwise specified or implied herein, the weight percent (wt %) of a particular component in a curable secondary composition refers to the amount of the component present in the curable secondary composition on an additive-free basis. Generally, the weight percentage of the monomer(s), oligomer(s), and initiator(s) sum to 100%. When present, the amount of an additive is reported herein in units of parts per hundred (pph) relative to the combined amounts of monomer(s), oligomer(s), and initiator(s). An additive present at the 1 pph level, for example, is present in an amount of 1 g for every 100 g of combined monomer(s), oligomer(s), and initiator(s).

In order to reduce cost, the oligomer content urethane oligomer content, or urethane acrylate oligomer content of the secondary composition may be minimized. Relative to the prevailing secondary compositions known in the art, the oligomer content, urethane oligomer content, or urethane acrylate oligomer content of the present secondary composition is particularly low. Oligomers, urethane oligomers, or urethane acrylate oligomers may be present as a minority component or completely absent from the secondary composition of the present disclosure. Oligomers, urethane oligomers, or urethane acrylate oligomers may be present in the secondary composition in an amount of about 3 wt % or less, or in an amount of about 2 wt % or less, or in an amount of about 1 wt % or less. The secondary composition may also be devoid of oligomers, urethane oligomers, or urethane acrylate oligomers.

The monomer component of the curable secondary composition may include one or more monomers. The one or more monomers may be present in the secondary composition in an amount of 50 wt % or greater, or in an amount from about 75 wt % to about 99 wt %, or in an amount from about 80 wt % to about 99 wt % or in an amount from about 85 wt % to about 98 wt %.

The monomer component of the curable secondary composition may include ethylenically unsaturated compounds. The ethylenically unsaturated monomers may be monofunctional or polyfunctional. The functional groups may be polymerizable groups and/or groups that facilitate or enable crosslinking. In combinations of two or more monomers, the constituent monomers may be monofunctional, polyfunctional, or a combination of monofunctional and polyfunctional compounds. Suitable functional groups for ethylenically unsaturated monomers include, without limitation, (meth)acrylates, acrylamides, N-vinyl amides, styrenes, vinyl ethers, vinyl esters, acid esters, and combinations thereof.

Exemplary monofunctional ethylenically unsaturated monomers include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., SR423, Sartomer Company, Inc.), tetrahydrofurfuryl acrylate (e.g., SR285, Sartomer Company, Inc.), caprolactone acrylate (e.g., SR495, Sartomer Company, Inc.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g., Photomer 4066, IGM Resins); acrylamides such as diacetone acrylamide, isobutoxymethyl acrylamide, N,N'-dimethyl-aminopropyl acrylamide, N,N-dimethyl acrylamide, N,N diethyl acrylamide, and t-octyl acrylamide; vinylic compounds such as N-vinylpyrrolidone and N-vinylcaprolactam; and acid esters such as maleic acid ester and fumaric acid ester. With respect to the long and short chain alkyl acrylates listed above, a short chain alkyl acrylate is an alkyl group with 6 or less carbons and a long chain alkyl acrylate is alkyl group with 7 or more carbons.

Many suitable monomers are either commercially available or readily synthesized using reaction schemes known in the art. For example, most of the above-listed monofunctional monomers can be synthesized by reacting an appropriate alcohol or amide with an acrylic acid or acryloyl chloride.

Representative polyfunctional ethylenically unsaturated monomers include, without limitation, alkoxylated bisphenol A diacrylates, such as ethoxylated bisphenol A diacrylate, with the degree of alkoxylation being 2 or greater. The monomer component of the secondary composition may include ethoxylated bisphenol A diacrylate with a degree of ethoxylation ranging from 2 to about 30 (e.g. SR349 and SR601 available from Sartomer Company, Inc. West Chester, Pa. and Photomer 4025 and Photomer 4028, available from IGM Resins), or propoxylated bisphenol A diacrylate with the degree of propoxylation being 2 or greater; for example, ranging from 2 to about 30; methylolpropane polyacrylates with and without alkoxylation such as ethoxylated trimethylolpropane triacrylate with the degree of ethoxylation being 3 or greater; for example, ranging from 3 to about 30 (e.g., Photomer 4149, IGM Resins, and SR499, Sartomer Company, Inc.); propoxylated-trimethylolpropane triacrylate with the degree of propoxylation being 3 or greater; for example, ranging from 3 to 30 (e.g., Photomer 4072, IGM Resins and SR492, Sartomer); ditrimethylolpropane tetraacrylate (e.g., Photomer 4355, IGM Resins); alkoxylated glyceryl triacrylates such as propoxylated glyceryl triacrylate with the degree of propoxylation being 3 or greater (e.g., Photomer 4096, IGM Resins and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, IGM Resins, and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with the degree of ethoxylation being 2 or greater; for example, ranging from about 2 to 30; epoxy acrylates formed by adding acrylate to bisphenol A diglycidylether and the like (e.g., Photomer 3016, IGM Resins); and single and multi-ring cyclic aromatic or non-aromatic polyacrylates such as dicyclopentadiene diacrylate and dicyclopentane diacrylate.

In addition to functioning as a polymerizable moiety, monofunctional monomers may also be included in the curable secondary composition for other purposes. Monofunctional monomer components may, for example, influence the degree to which the cured product absorbs water, adheres to other coating materials, or behaves under stress.

The secondary composition may or may not include an oligomeric component. As indicated hereinabove, if present, oligomers may be present as a minor constituent in the secondary composition. One or more oligomers may be present in the secondary composition. One class of oligomers that may be included in the secondary composition is ethylenically unsaturated oligomers. When employed, suitable oligomers may be monofunctional oligomers, polyfunctional oligomers, or a combination of a monofunctional oligomer and a polyfunctional oligomer. If present, the oligomer component of the secondary composition may include aliphatic and aromatic urethane (meth)acrylate oligomers, urea (meth)acrylate oligomers, polyester and polyether (meth)acrylate oligomers, acrylated acrylic oligomers, polybutadiene (meth)acrylate oligomers, polycarbonate (meth)acrylate oligomers, and melamine (meth)acrylate oligomers or combinations thereof. The secondary composition may be free of urethane groups, urethane acrylate compounds, urethane oligomers, or urethane acrylate oligomers.

The oligomeric component the secondary composition may include a difunctional oligomer. A difunctional oligomer may have a structure according to formula (I) below:

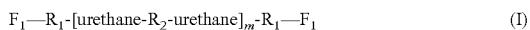

$$F_1-R_1-[\text{urethane-}R_2\text{-urethane}]_m-R_1-F_1 \qquad (I)$$

where $F_1$ may independently be a reactive functional group such as acrylate, methacrylate, acrylamide, N-vinyl amide, styrene, vinyl ether, vinyl ester, or other functional group known in the art; $R_1$ may include, independently, $-C_{2\text{-}12}$ $O-$, $-(C_{2\text{-}4}-O)_n-$, $-C_{2\text{-}12}$ $O-(C_{2\text{-}4}$ $O)_n-$, $-C_{2\text{-}12}$ $O-(CO-C_{2\text{-}5}$ $O)_n-$, or $-C_{2\text{-}12}$ $O-(CO-C_{2\text{-}5}$ $NH)_n-$ where n is a whole number from 1 to 30, including, for example, from 1 to 10; $R_2$ may be a polyether, polyester, polycarbonate, polyamide, polyurethane, polyurea, or combination thereof; and m is a whole number from 1 to 10, including, for example, from 1 to 5. In the structure of formula (I), the urethane moiety may be the residue formed from the reaction of a diisocyanate with $R_2$ and/or $R_1$. The term "independently" is used herein to indicate that each $F_1$ may differ from another $F_1$ and the same is true for each $R_1$.

The oligomer component of the curable secondary composition may include a polyfunctional oligomer. The polyfunctional oligomer may have a structure according to formula (II), formula (III), or formula (IV) set forth below:

$$\text{multiurethane-}(F_2-R_1-F_2)_x \qquad (II)$$

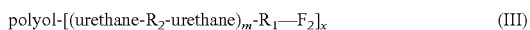

$$\text{polyol-}[(\text{urethane-}R_2\text{-urethane})_m-R_1-F_2]_x \qquad (III)$$

$$\text{multiurethane-}(R_1-F_2)_x \qquad (IV)$$

where $F_2$ may independently represent from 1 to 3 functional groups such as acrylate, methacrylate, acrylamide, N-vinyl amide, styrene, vinyl ether, vinyl ester, or other functional groups known in the art; $R_1$ can include $-C_{2\text{-}12}$ $O-$, $-(C_{2\text{-}4}-O)_n-$, $-C_{2\text{-}12}$ $O-(C_{2\text{-}4}$ $O)_n-$, $-C_{2\text{-}12}$ $O-(CO-C_{2\text{-}5}$ $O)_n-$, or $-C_{2\text{-}12}$ $O-(CO-C_{2\text{-}5}$ $NH)_n-$ where n is a whole number from 1 to 10, including, for example, from 1 to 5; $R_2$ may be polyether, polyester, polycarbonate, polyamide, polyurethane, polyurea or combinations thereof; x is a whole number from 1 to 10, including, for example, from 2 to 5; and m is a whole number from 1 to 10, including, for example, from 1 to 5. In the structure of formula (II), the multiurethane group may be the residue formed from reaction of a multiisocyanate with $R_2$. Similarly, the urethane group in the structure of formula (III) may be the reaction product formed following bonding of a diisocyanate to $R_2$ and/or $R_1$.

Urethane oligomers may be prepared by reacting an aliphatic or aromatic diisocyanate with a dihydric polyether or polyester, most typically a polyoxyalkylene glycol such as a polyethylene glycol. Moisture-resistant oligomers may be synthesized in an analogous manner, except that polar polyethers or polyester glycols are avoided in favor of predominantly saturated and predominantly nonpolar aliphatic diols. These diols may include alkane or alkylene diols of from about 2-250 carbon atoms that may be substantially free of ether or ester groups.

Polyurea elements may be incorporated in oligomers prepared by these methods, for example, by substituting diamines or polyamines for diols or polyols in the course of synthesis. The presence of minor proportions of polyureas in the secondary coating composition is not considered detrimental to coating performance, provided that the diamines or polyamines employed in the synthesis are sufficiently non-polar and saturated as to avoid compromising the moisture resistance of the system.

The secondary coating compositions may also contain a polymerization initiator to facilitate polymerization (curing) of the secondary composition after its application to a glass fiber or a glass fiber previously coated with a primary or other layer. Polymerization initiators suitable for use in the compositions of the present invention may include thermal initiators, chemical initiators, electron beam initiators, microwave initiators, actinic-radiation initiators, and photoinitiators. For many acrylate-based coating formulations, photoinitiators, such as the known ketonic photoinitiating and/or phosphine oxide additives, may be used. When used in the compositions of the present invention, the photoinitiator may be present in an amount sufficient to provide rapid ultraviolet curing. The photoinitiator may be present in an amount ranging from about 0.5 wt % to about 10 wt %, or from about 1.5 wt % to about 7.5 wt %, or in an amount of about 3 wt %.

The amount of photoinitiator may be adjusted to promote radiation cure to provide reasonable cure speed without causing premature gelation of the coating composition. A desirable cure speed may be a speed sufficient to cause curing of the coating composition of greater than about 90%, or greater than 95%). As measured in a dose versus modulus curve, a cure speed for coating thicknesses less than about 75 microns may be, for example, less than 1.0 J/cm$^2$ or less than 0.5 J/cm$^2$.

Suitable photoinitiators may include, without limitation, 2,4,6-trimethylbenzoyl-diphenylphosphine oxide (e.g. Lucirin TPO); 1-hydroxycyclohexylphenyl ketone (e.g. Irgacure 184 available from BASF); (2,6-diethoxybenzoyl)-2,4,4-trimethylpentyl phosphine oxide (e.g. in commercial blends Irgacure 1800, 1850, and 1700, BASF); 2,2-dimethoxyl-2-phenyl acetophenone (e.g., Irgacure,651, BASF); bis(2,4,6-trimethylbenzoyl)phenyl phosphine oxide (e.g., Irgacure 819, BASF); (2,4,6-triiethylbenzoyl)diphenyl phosphine oxide (e.g., in commercial blend Darocur 4265, BASF); 2-hydroxy-2-methyl-1-phenylpropane-1-one (e.g., in commercial blend Darocur 4265, BASF) and combinations thereof.

In addition to the above-described components, the secondary coating composition of the present invention may optionally include an additive or a combination of additives. Representative additives include, without limitation, antioxidants, catalysts, lubricants, low molecular weight non-crosslinking resins, adhesion promoters, and stabilizers. Additives may operate to control the polymerization process, thereby affecting the physical properties (e.g., modulus, glass transition temperature) of the polymerization product formed from the composition. Additives may affect the integrity of the polymerization product of the composition (e.g., protect against de-polymerization or oxidative degradation).

The secondary composition may include thiodiethylene bis(3,5-di-tert-butyl)-4-hydroxyhydrocinnamate (e.g., Irganox 1035, available from BASF) as an antioxidant. The secondary composition may include an acrylated acid adhesion promoter (such as Ebecryl 170 (available from UCB Radcure (Smyrna Ga.)). Other suitable materials for use in secondary coating materials, as well as considerations related to selection of these materials, are well known in the art and are described in U.S. Pat. Nos. 4,962,992 and 5,104,433, the disclosures of which are incorporated herein by reference.

Even with low oligomer content, the present secondary compositions may result in a secondary coating material having high tensile strength and a high modulus of elasticity (Young's modulus). The secondary coating may have a higher modulus of elasticity and higher glass transition temperature than the primary coating. As used herein, in situ modulus of the secondary coating is the modulus measured by the technique described below.

Secondary in Situ Modulus

The secondary in situ modulus is measured using fiber tube-off samples. To obtain a fiber tube-off sample, a 0.0055 inch Miller stripper is first clamped down approximately 1 inch from the end of the coated fiber. The one-inch region of fiber extending from the stripper is plunged into a stream of liquid nitrogen and held for 3 seconds. The optical fiber is then removed from the stream of liquid nitrogen and quickly stripped. The stripped end of the optical fiber is inspected to insure that the coating is removed. If coating remains on the glass, the sample is prepared again. The result is a hollow tube of primary and secondary coatings. The diameters of the glass, primary coating and secondary coating are measured from the end-face of the unstripped fiber.

To measure secondary in situ modulus, fiber tube-off samples can be run with an instrument such as a Rheometrics DMTA IV instrument at a sample gauge length 11 mm. The width, thickness, and length of the sample are determined and provided as input to the operating software of the instrument. The sample is mounted and run using a time sweep program at ambient temperature (21° C.) using the following parameters: Frequency: 1 Rad/sec, Strain: 0.3%, Total Time=120 sec., Time Per Measurement=1 sec, Initial Static Force=15.0 [g], Static >Dynamic Force by=10.0 [%]

Once completed, the last five E' (storage modulus) data points are averaged. Each sample is run three times (fresh sample for each run) for a total of fifteen data points. The averaged value of the three runs is reported as the secondary in situ modulus.

The tensile strength of the polymerization product of the secondary composition of the present disclosure, when prepared in the form of cured rods, may be at least 50 MPa. When measured on cured coating rods at room temperature (~21° C.), the modulus of elasticity of the cured product of the secondary composition may be in the range from about 1400 MPa to about 2200 MPa, or in the range from about 1700 MPa to about 2100 MPa, or in the range from about 1600 MPa to about 3000 MPa. The in situ modulus of elasticity of the secondary coating may be 1200 MPa or greater, or 1500 MPa or greater, or 1800 MPa or greater, or 2100 MPa or greater, or 2400 MPa or greater, or 2700 MPa or greater.

Young's Modulus, Tensile Strength and %
Elongation at Break

Coating compositions are prepared in the form of rod samples for tensile testing. Rods are prepared by injecting the curable compositions into Teflon® tubing having an inner diameter of about 0.025". The rod samples are cured using a Fusion D bulb at a dose of about 2.4 J/cm² (measured over a wavelength range of 225-424 nm by a Light Bug model IL390 from International Light). After curing, the Teflon® tubing is stripped away to provide rod samples of the coating composition. The cured rods are allowed to condition overnight at 23° C. and 50% relative humidity. Properties such as Young's modulus, tensile strength, and % elongation at break are measured using a tensile testing instrument (e.g., a Sintech MTS Tensile Tester, or an Instron Universal Material Test System) on defect-free rod samples with a gauge length of 51 mm, and a test speed of 250 mm/min. The properties are determined as an average of at least five samples, with defective samples being excluded from the average.

High modulus secondary coatings may offer better protection of the optical fiber against mechanical damage and better microbend performance. However, high speed processing of high modulus secondary coatings in the draw tower may be a challenge because of an increased tendency to of the draw process to generate defects such as flat spots and wind induced point defects (WIPD) in the secondary coating that ultimately compromise fiber performance.

During the development of oligomer-free coatings urethane-oligomer-free coatings and urethane-acrylate-oligomer-free coatings, it was found that removal of the oligomer from the formulation, without modifying other components, may result in a secondary coating with a modulus of higher than 2000 MPa. Such secondary coatings that may be difficult to process at high speeds in the draw tower. Accordingly, it may be desirable to compensate for the effect of removing the oligomer by formulating the secondary composition to include monomers with long flexible (e.g. ethoxylated) chains between functional groups. Long flexible chains may increase the distance between crosslinks, may decrease the crosslink density and may ultimately lower the modulus of the cured secondary coating. A potential drawback of such monomers is that they may have a lower glass transition temperature (Tg) and may tend to decrease the Tg of the cured secondary coating. Secondary coatings with low Tg may not be desirable because a low Tg may result in a material that is too soft at the time of application and may lead to defects during processing at high speed. Higher Tg secondary coatings may be harder at room temperature and may provide better mechanical protection to the optical fiber. If the Tg is too high, however, the coating may be sufficiently stiff to make the optical fiber more prone to defects during processing.

The secondary coating of the present disclosure may be designed to achieve a secondary coating with moderate Tg that imparts adequate mechanical protection and bend insensitivity to the optical fiber while still allowing the optical fiber to be processed defect-free in high speed draw towers. Tg can be measured using the technique that is now described.

Glass transition temperatures are measured using samples in the form of cured films (primary coating) or rods (secondary coating) formed from the coating composition. Glass transition temperatures are measured by determining the peak of the tan □ curves obtained from an instrument such as a Rheometrics DMTA IV in tension. The width, thickness, and length of the sample are input to the "Sample Geometry" section of the program. The sample is mounted and then cooled to approximately −85° C. Once stable, a temperature ramp is run using the following parameters: Frequency: 1 Hz, Strain: 0.3%, Heating Rate: 2° C./min., Final Temperature: 150° C., Initial Static Force=20.0 [g], Static>Dynamic Force by=10.0 [%]

Tg is defined as the maximum of the tan δ peak, where the tan δ peak is defined as:

$$\tan \delta = E''/E'$$

where $E''$ is the loss modulus, which is proportional to the loss of energy as heat in a cycle of deformation and $E'$ is the storage or elastic modulus, which is proportional to the energy stored in a cycle of deformation.

The Tg of cured rods prepared from the cured product of the secondary coating composition may be at least about 50° C. The glass transition temperature of the secondary coating may be at least 50° C., or at least 55° C., or at least 60° C., or between 55° C. and 65° C.

The secondary composition may be devoid of an oligomeric component, a urethane oligomeric component, or a urethane-acrylate oligomeric component, and the monomeric component may include ethoxylated(4) bisphenol-A diacrylate monomer, ethoxylated(30) bisphenol-A diacrylate monomer, and epoxy diacrylate monomer. The ethoxylated (4) bisphenol-A diacrylate monomer may be present in an amount ranging from about 50 wt % to about 90 wt %, or from about 60 wt % to about 80 wt %, or and from about 70 wt % to about 75 wt %. The ethoxylated(30) bisphenol-A diacrylate monomer may be present in an amount ranging from about 5 wt % to about 20 wt %, or from about 7 wt % to about 15 wt %, or from about 8 wt % to about 12 wt %. The epoxy diacrylate monomer may be present in an amount of ranging from about 5 wt % to about 25 wt, or from about 10 wt % to about 20 wt %, or from about 12 wt % to about 18 wt %.

The secondary composition may be devoid of an oligomeric component, a urethane oligomeric component, or a urethane-acrylate oligomeric component, and the monomeric component may include ethoxylated(4) bisphenol-A diacrylate monomer, ethoxylated(10) bisphenol-A diacrylate monomer, and epoxy diacrylate monomer. The ethoxylated (4) bisphenol-A diacrylate monomer may be present in an amount ranging from about 30 wt % to about 80 wt %, or from about 40 wt % to about 70 wt %, or from about 50 wt % to about 60 wt %. The ethoxylated(10) bisphenol-A diacrylate monomer may be present in an amount ranging from about 10 wt % to about 50 wt %, or from about 20 wt % to about 40 wt %, or from about 25 wt % to about 35 wt %. The epoxy diacrylate monomer may be present in an amount ranging from about 5 wt % to about 25 wt %, or from about 10 wt % to about 20 wt %, or from about 12 wt % to about 18 wt %.

The secondary composition may be devoid of an oligomeric component, a urethane oligomeric component, or a urethane-acrylate oligomeric component, and the monomeric component may include ethoxylated(4) bisphenol-A diacrylate monomer, ethoxylated(10) bisphenol-A diacrylate monomer, ethoxylated(30) bisphenol-A diacrylate monomer, and epoxy diacrylate monomer. The ethoxylated(4) bisphenol-A diacrylate monomer may be present in an amount ranging from about 40 wt % to about 80 wt %, or from about 60 wt % to about 70 wt %. The ethoxylated(10) bisphenol-A diacrylate monomer may be present in an amount ranging from about 1 wt % to about 30 wt %, or from about 5 wt % to about 10 wt %. The ethoxylated(30) bisphenol-A diacrylate monomer may be present in an amount ranging from about 5 wt % to about 20 wt %, or in an amount of about 10 wt %. The epoxy diacrylate monomer may be present in an amount ranging from about 5 wt % to about 25 wt %, or in an amount of about 15 wt %.

The secondary composition may be devoid of an oligomeric component, a urethane oligomeric component, or a urethane-acrylate oligomeric component, and the monomeric component may include ethoxylated (10) bisphenol A diacrylate monomer, tripropylene glycol diacrylate monomer, ethoxylated (4) bisphenol A diacrylate monomer, and epoxy diacrylate monomer. The ethoxylated (10) bisphenol A diacrylate monomer may be present in an amount ranging from about 10 wt % to about 50 wt %. The tripropylene glycol diacrylate monomer may be present in an amount from about 5 wt % to about 40 wt %. The ethoxylated (4) bisphenol A diacrylate monomer may be present in an amount from about 10 wt % to about 55 wt %. The epoxy diacrylate monomer may be present in an amount up to about 15 wt %.

The secondary composition may comprise from about 40 wt % to 80 wt % of ethoxylated (4) bisphenol A monomer, from about 0 wt % to about 30% of ethoxylkated (10) bisphenol A monomer, from about 0 wt % to about 25% wt % of ethoxylated (30) bisphenol A monomer, from about 5 wt % to 18 wt % of epoxy acrylate, from about 0 wt % to 10 wt % of tricyclodecane dimethanoldiacrylate monomer, from about 0.1 wt % to 40% of one or more photoinitiators, from about 0 pph to 5 pph by weight of slip additive; and from 0 pph to about 5 pph by weight of an antioxidant. The secondary composition may further comprise 3% or less oligomer, or 1% or less oligomer, or may be devoid of oligomer. The epoxy acrylate may be an epoxy acrylate monomer. The epoxy acrylate may be bisphenol A epoxy diacrylate. The epoxy acrylate may be an unmodified epoxy acrylate, for example an epoxy acrylate which is not modified with fatty acid, amine, acid, or aromatic functionality. Such compositions may have a viscosity at 45° C. of at least about 3 Poise and when cured, may exhibit a Young's modulus of from about 1400 MPa to about 2100 MPa. The compositions may exhibit a glass transition temperature of at least about 55° C. The monomeric component may include an alkoxylated bisphenol A diacrylate monomer having at least 10 alkoxy groups.

The primary and secondary curable compositions may be applied to the glass portion of the coated fiber after it has been drawn from the preform. The primary and secondary compositions may be applied immediately after cooling. The curable compositions may then be cured to produce the coated optical fiber. The method of curing may be thermal, chemical, or radiation induced, such as by exposing the applied curable composition on the glass fiber to ultraviolet light, actinic radiation, microwave radiation, or an electron beam, depending upon the nature of the coating composition(s) and polymerization initiator being employed. It may be advantageous to apply both a primary curable composition and a secondary curable composition in sequence following the draw process. Methods of applying dual layers of curable compositions to a moving glass fiber are disclosed in U.S. Pat. Nos. 4,474,830 and 4,585,165, the disclosures of which are hereby incorporated by reference herein. The primary curable composition may alternatively be applied and cured to form the primary coating material before applying and curing the secondary curable composition to form the secondary coating.

EXAMPLES

Various exemplary coated fibers in accordance with the present disclosure are now described and modeled to illustrate one or more advantageous features disclosed herein.

The coated fibers modeled for these examples included a glass fiber with a diameter of 125 microns, but the results are equally applicable to glass fibers with diameters of 90 microns or smaller. The core of the glass fiber had a radius ranging between 3.6 to 5.4 microns and may be made by modifying silica with $GeO_2$ to increase the index of the core relative to the cladding. The cladding surrounded the core, extended to a radius of 62.5 microns and included an inner cladding region and an outer cladding region where the inner cladding region had a lower index than the outer cladding. The lower index of the inner cladding region relative to the outer cladding may be achieved by doping the inner cladding with the downdopant fluorine. Alternatively, the higher index of the outer cladding region relative to the inner cladding region may be achieved by doping the outer cladding with updopants such as chlorine, germania, alumina, titania, silicon oxynitride, phosphorus, etc. Exemplary refractive index profiles will be discussed more fully hereinbelow.

Representative curable compositions A-H for the primary coating are shown in Table II below.

TABLE II

| Illustrative Primary Coating Compositions | | | | | | | | |
|---|---|---|---|---|---|---|---|---|
| Component | A | B | C | D | E | F | G | H |
| Photomer 4066 (wt %) | 41.5 | 0 | 61.5 | 41.5 | 46.5 | 46.5 | 45.5 | 47 |
| Photomer 4960 (wt %) | 0 | 41.5 | 0 | 0 | 0 | 0 | 0 | 0 |
| BR3741 (wt %) | 55 | 55 | 35 | 55 | 50 | 50 | 50 | 50 |
| N-vinyl caprolactam (wt %) | 2 | 2 | 2 | 2 | 2 | 2 | 2 | 1.5 |
| TPO (wt %) | 1.5 | 1.5 | 1.5 | 1.5 | 1.5 | 1.5 | 2.5 | 1.5 |
| (3-acryloxypropyl) trimethoxysilane (pph) | 1 | 1 | 1 | 1 | 1 | 0.8 | 0.8 | 0.8 |
| Irganox 1035 (pph) | 1 | 1 | 1 | 1 | 1 | 1 | 1 | 1 |
| Pentaerythritol mercaptopropionate (pph) | 0.03 | 0.03 | 0.03 | 0.03 | 0.03 | 0.03 | 0.03 | 0.03 |
| Uvitex OB (pph) | 0.05 | 0 | 0 | 0 | 0 | 0 | 0 | 0 |

Photomer 4066 is an ethoxylated nonyl phenol acrylate available from IGM Resins. Photomer 4960 is a propoxylated nonyl phenol acrylate available from IGM Resins. BR3741 is an aliphatic polyether urethane acrylate oligomer available from Dymax Oligomers and Coatings. N-vinyl caprolactam is available from ISP Technologies, Inc. TPO ((2,4,6-trimethylbenzoyl)diphenyl phosphine oxide) is a photoinitiator available from BASF. (3-acryloxypropyl) trimethoxysilane is an adhesion promoter available from Gelest. IRGANOX 1035 ((thiodiethylene bis[3-(3,5-di-tert-butyl)-4-hydroxyphenyl) propionate]) is an antioxidant available from BASF. Pentaerythritol mercaptopropionate is an adhesion promoter stabilizer available from Aldrich. UVITEX OB ($C_{26}H_{26}N_2O_2S$, CAS No. 7128-64-5) is an optical brightener available from BASF.

To prepare the primary composition, the oligomer and monomer(s) may be blended together for at least 10 minutes at 60° C. Photoinitiator(s) and additives may then be added, and blending may be continued for one hour. Finally, the adhesion promoter may be added, and blending may be continued for 30 minutes. The resulting solution may then be applied to the glass portion of the optical fiber and UV-cured to form a primary coating.

Representative curable compositions J-L for the secondary coating are shown in Table II below.

TABLE III

Illustrative Secondary Coating Compositions

| Component | J | K | L |
|---|---|---|---|
| SR601/Photomer4028 (wt %) | 72 | 52 | 72 |
| CD9038 (wt %) | 10 | 0 | 10 |
| Photomer3016 (wt %) | 15 | 15 | 15 |
| SR602 (wt %) 30 wt % | 0 | 30 | 0 |
| Irgacure 184 (wt %) | 1.5 | 1.5 | 1.5 |
| TPO (wt %) | 1.5 | 1.5 | 1.5 |
| DC190 Fluid slip additive (pph) | 0 | 0 | 1 |
| Irganox 1035 (pph) | 0.5 | 1 | 1 |

SR601/Photomer 4028 is an ethoxylated (4)bisphenol A diacrylate monomer available from Sartomer or IGM Resins. CD9038 is an ethoxylated (30)bisphenol A diacrylate monomer available from Sartomer. Photomer 3016 is an epoxy diacrylate monomer available from IGM Resins. SR602 is an ethoxylated (10)bisphenol A diacrylate monomer available from Sartomer. IRGACURE 184 (1-hydroxycyclohexylphenyl ketone) is a photoinitiator available from BASF. TPO ((2,4,6-trimethylbenzoyl)-diphenyl phosphine oxide) is a photoinitiator available from BASF. DC190 is a fluid slip additive available from Dow Corning. IRGANOX 1035 (thiodiethylene bis(3,5-di-tert-butyl)-4-hydroxyhydrocinnamate) is an antioxidant available from BASF.

Secondary compositions may be prepared with the listed components using commercial blending equipment. The monomer components may be weighed, introduced into a heated kettle, and blended together at a temperature within the range of from about 50° C. to 65° C. Blending may be continued until a homogenous mixture is obtained. Next, the photoinitiator may be weighed and introduced into the homogeneous solution while blending. Finally, the remaining components may be weighed and introduced into the solution while blending. Blending may be continued until a homogeneous solution is again obtained. The homogeneous solution may then be applied to the primary coating or primary composition of the optical fiber and cured with UV radiation to form a secondary coating.

Figure 5:
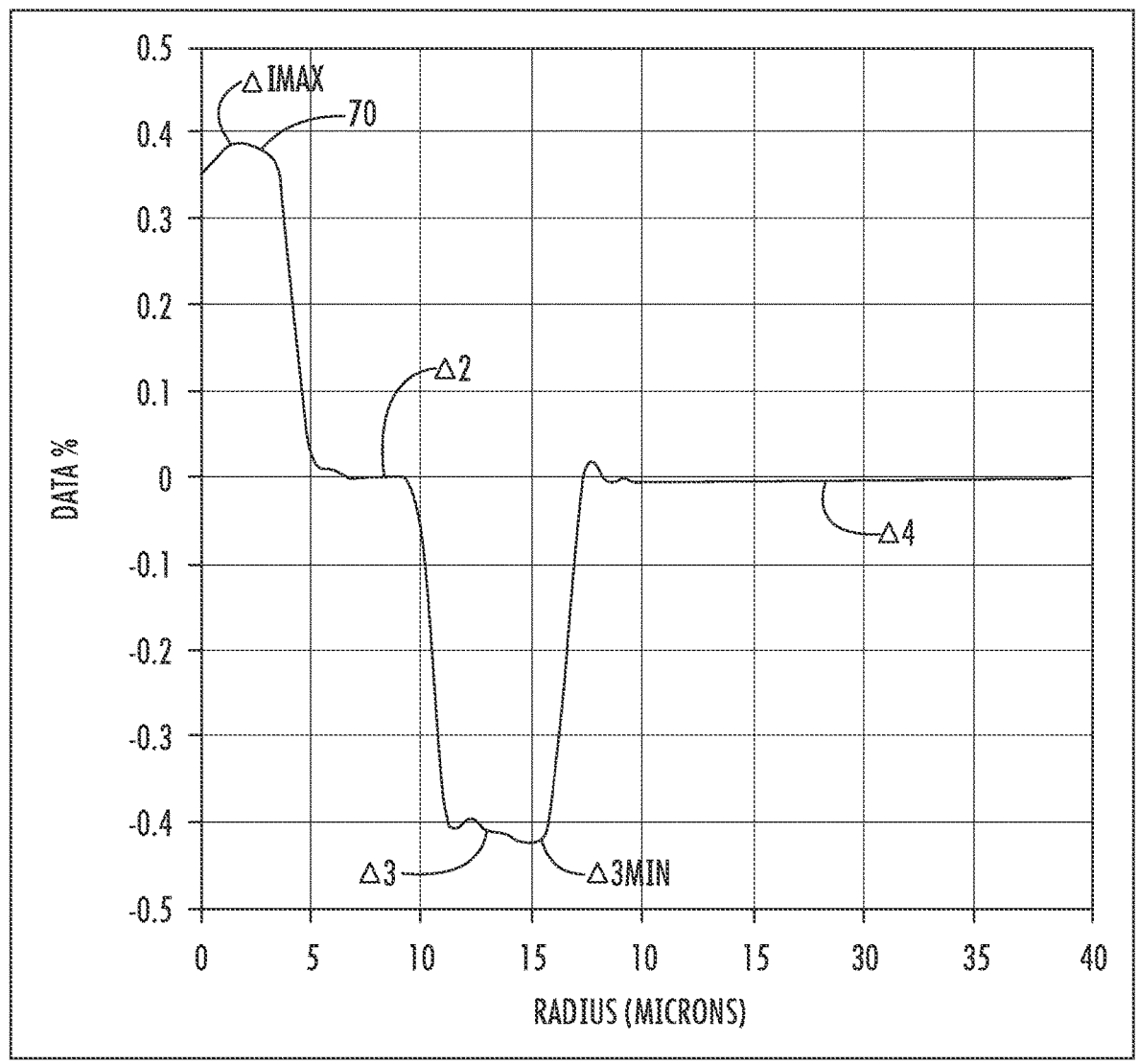
FIG. 5 is a plot of a measured core-cladding refractive index profile of an exemplary embodiment of the optical fiber.

Two coated fibers embodiments 60 (Example A and Example B fibers) having properties consistent with the coatings achievable by curing the primary and secondary compositions listed in Tables II and III were manufactured and then evaluated. The schematic cross-section of these coated fibers is shown in FIG. 2. The manufactured (example A and B) fibers include a core 70, cladding 80, a primary coating 90 and a secondary coating 100. Cladding 80 includes first inner cladding region 81, second inner cladding region 83, and outer cladding region 85. Example A fiber 60 includes a core 70 with core radius $r_1$=4.7 microns, a glass cladding 80 with an outer diameter $2r_4$ of about 72 microns, a primary coating 90 with an outer diameter of $2r_5$ of about 125 microns, and secondary coating 100 with an outer diameter $2r_6$=of 155 microns. The core was updoped with germania, the first inner cladding was comprised of essentially pure silica, the second inner cladding was downdoped with fluorine, and the outer cladding was comprised of essentially pure silica. Other parameters of example 1 fiber are as follows:

$\Delta_{1MAX}$=0.38%
$r_2$=9.25 microns
$r_3$=14.62 microns
$\Delta_{3MIN}$=−0.42%
$V_3$, =−52.4%-sq. microns The measured relative refractive index profile plot (expressed as $\Delta$ % relative to pure silica) for the core and cladding of the Example A fiber is shown in FIG. 5.

Example 2C fiber includes a core 70 with core radius $r_1$=of 5.2 microns, a glass cladding 80 with an outer diameter $2r_4$=80 microns, a primary coating 90 with an outer diameter of $2r_5$=125 microns, and secondary coating 100 with an outer diameter $2r_6$=of 155 microns. The core was updoped with germania, the first inner cladding was comprised of essentially pure silica, the second inner cladding was downdoped with fluorine, and the outer cladding was comprised of essentially pure silica.

Figure 6:
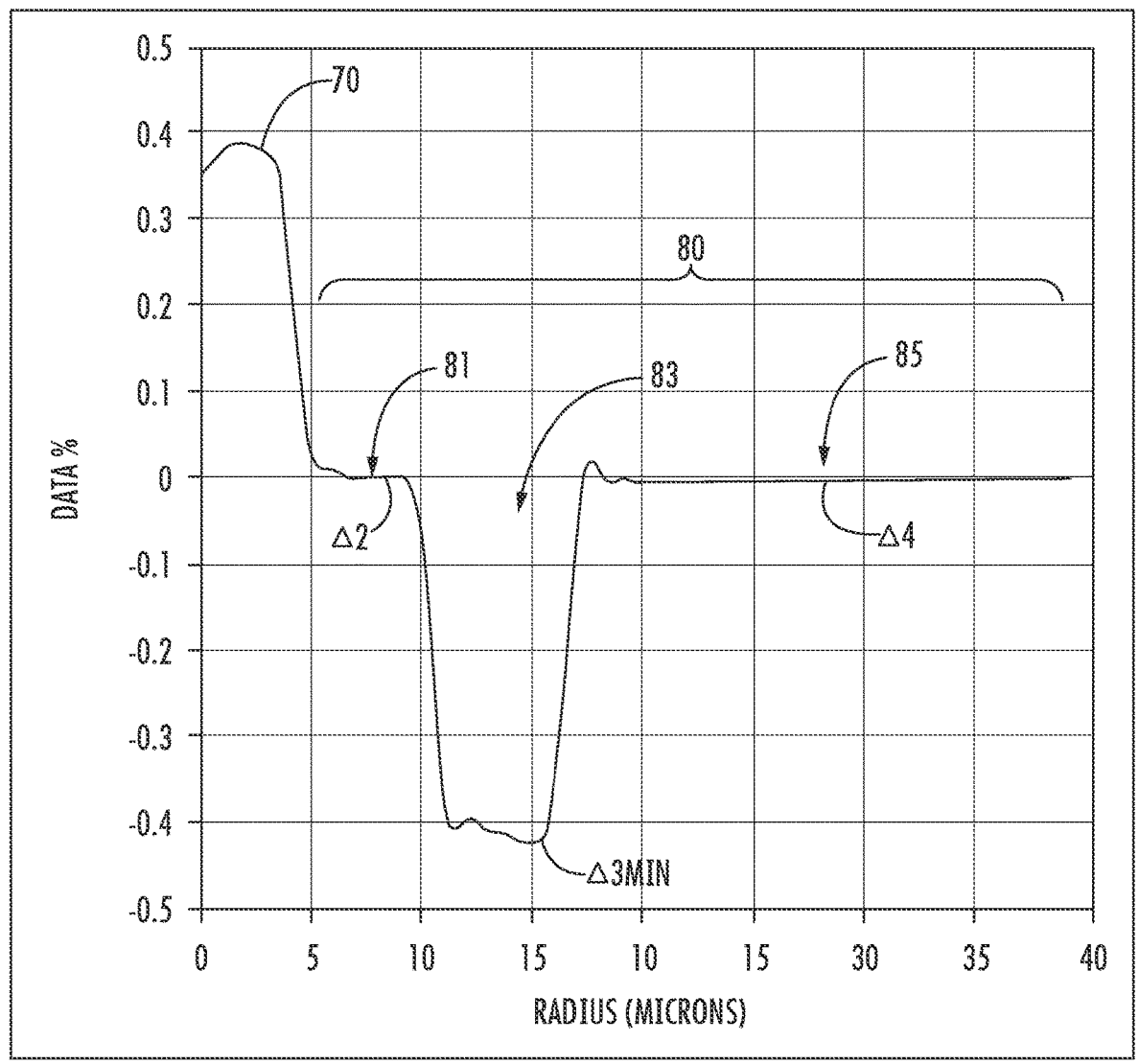
FIG. 6 is a plot of a measured core-cladding refractive index profile of another exemplary embodiment of the optical fiber.

The measured refractive index profile of the Example B fiber 60 is shown in FIG. 6. Other parameters of example 2C fiber are as follows:

$\Delta_{1MAX}$=0.38%
$r_2$=10.36 microns
16.47 microns
$\Delta_{3MIN}$=−0.42%
$V_3$, =−66.9%-sq. microns The relative refractive index profile plot (expressed as $\Delta$ % relative to pure silica) for the core and cladding of the Example B fiber 60 is shown in FIG. 6.

Table IV depicts measured parameters/attributes of the manufactured fiber embodiments according to examples A and B.

TABLE IV

Fiber Performance Data.

| Measured Attribute | Example A fiber | Example B fiber |
|---|---|---|
| Total Length (m) | 20000 | 15075 |
| Average Core-Clad Concentricity (microns) | 0.08 | 0.09 |
| Cladding Diameter (microns) | 71.84 ± 0.04 | 80.37 ± 0.06 |
| MFD 1310 (microns) | 8.52 | 8.80 |
| MFD 1550 (microns) | 9.59 | 9.89 |
| Fiber cutoff wavelength (nm) | 1168 | 1309 |
| Attenuation at 1310 nm (dB/km) | 0.393 | 0.372 |
| Attenuation at 1550 nm (dB/km) | 0.467 | 0.227 |
| Attenuation at 1625 nm (dB/1(m) | 0.908 | 0.248 |
| 1 × 10 mm macrobend at 1300 nm (dB/turn) | 0.041 | 0.02 |
| 1 × 10 mm macrobend at 1550 nm (dB/turn) | 0.24 | 0.1 |
| 1 × 10 mm macrobend at 1625 nm (dB/turn) | 0.3 | 0.19 |

Figure 7:
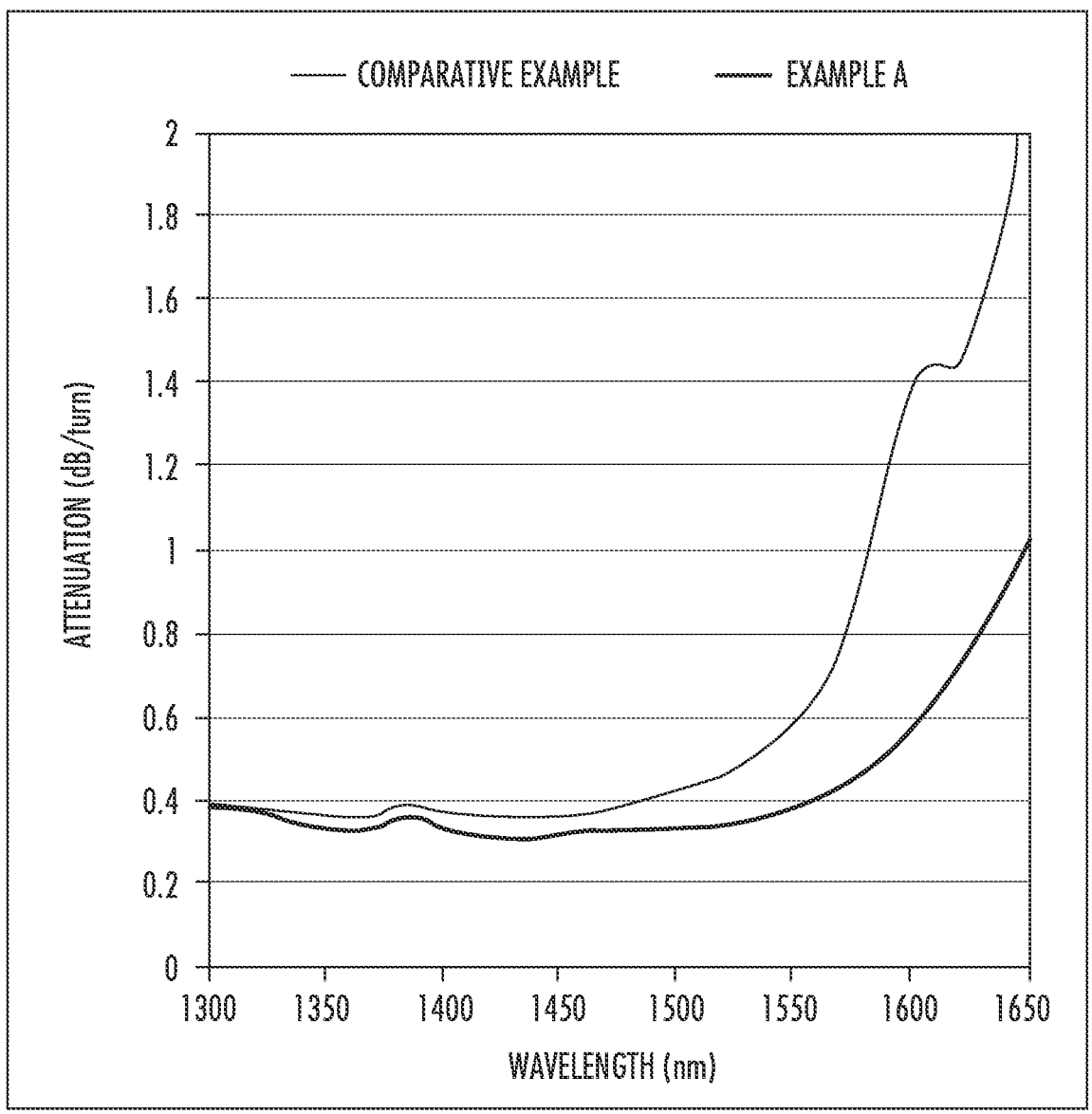
FIG. 7 depicts the measured attenuation vs. wavelength for the optical fiber corresponding to FIG. 5, and for a comparative fiber.

FIG. 7 depicts attenuation vs. wavelength for the Example A fiber embodiment and for a comparative fiber. The comparative fiber had the following parameters: core having a step index profile, $\Delta_{1MAX}$=0.35% and a core radius of 4.7 microns, a cladding diameter of 80.0 microns, a primary coating diameter of 110 microns, and a secondary coating diameter of 165 microns. This fiber has a MFD at 1310 nm wavelength of 9 microns, and a fiber cutoff wavelength of 1200 nm. The attenuation was measured with the fibers deployed on shipping spools. FIG. 7 illustrates that example A fiber provides significantly better performance (lower attenuation) for all wavelengths between 1325 and 1650 nm, and far better performance at wavelengths between 1550 to 1650 nm.

Figure 8:
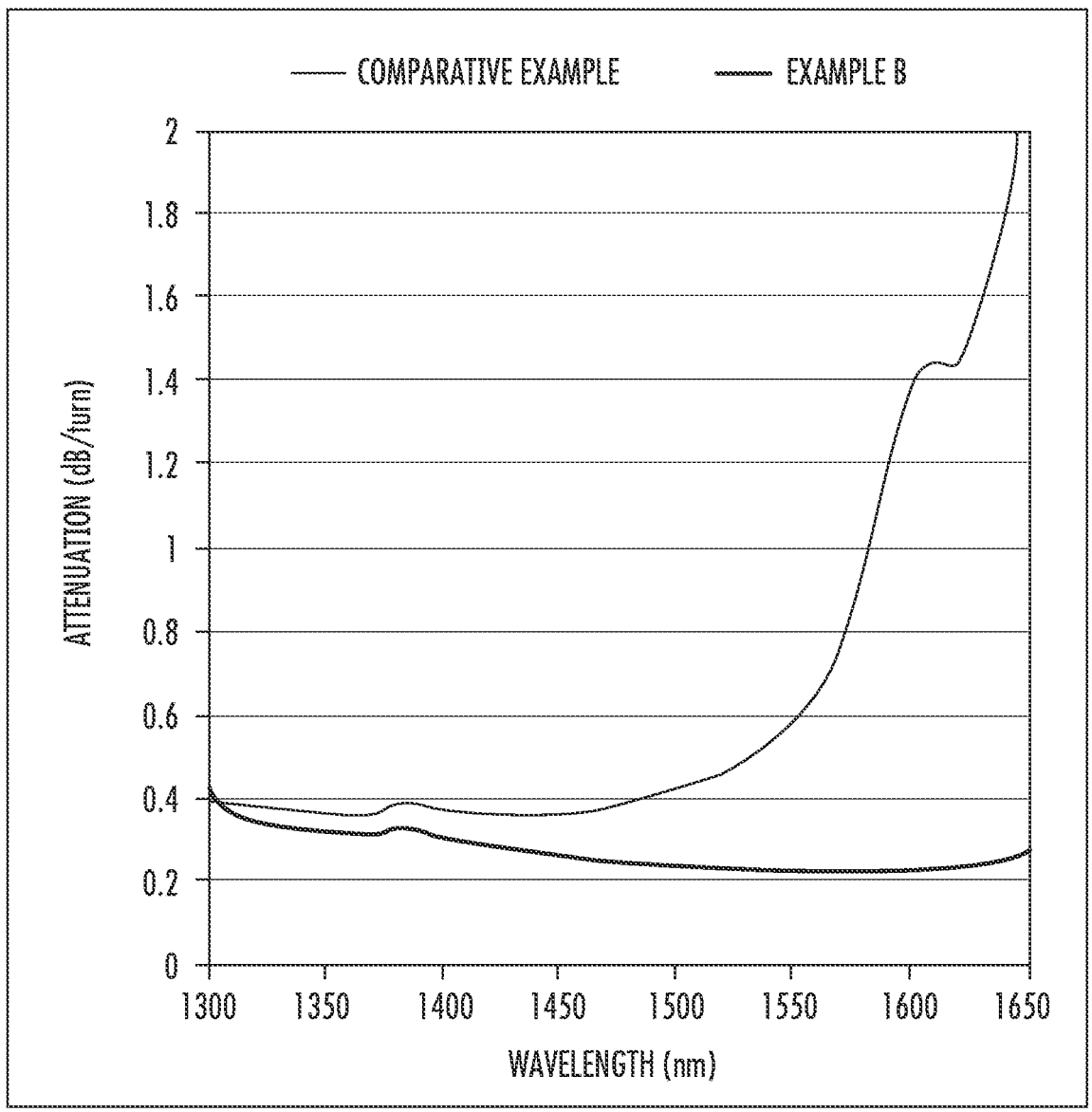
FIG. 8 depicts the measured attenuation vs. wavelength for the optical fiber corresponding to FIG. 6, and for the same comparative fiber.

FIG. 8 depicts attenuation vs. wavelength for the Example B fiber embodiment and for the comparative fiber described above. FIG. 8 illustrates that example B fiber provides significantly better performance (lower attenuation) for all wavelengths between 1325 and 1650 nm, and far better performance at wavelengths between 1450 nm to 1650 nm.

Figure 9:
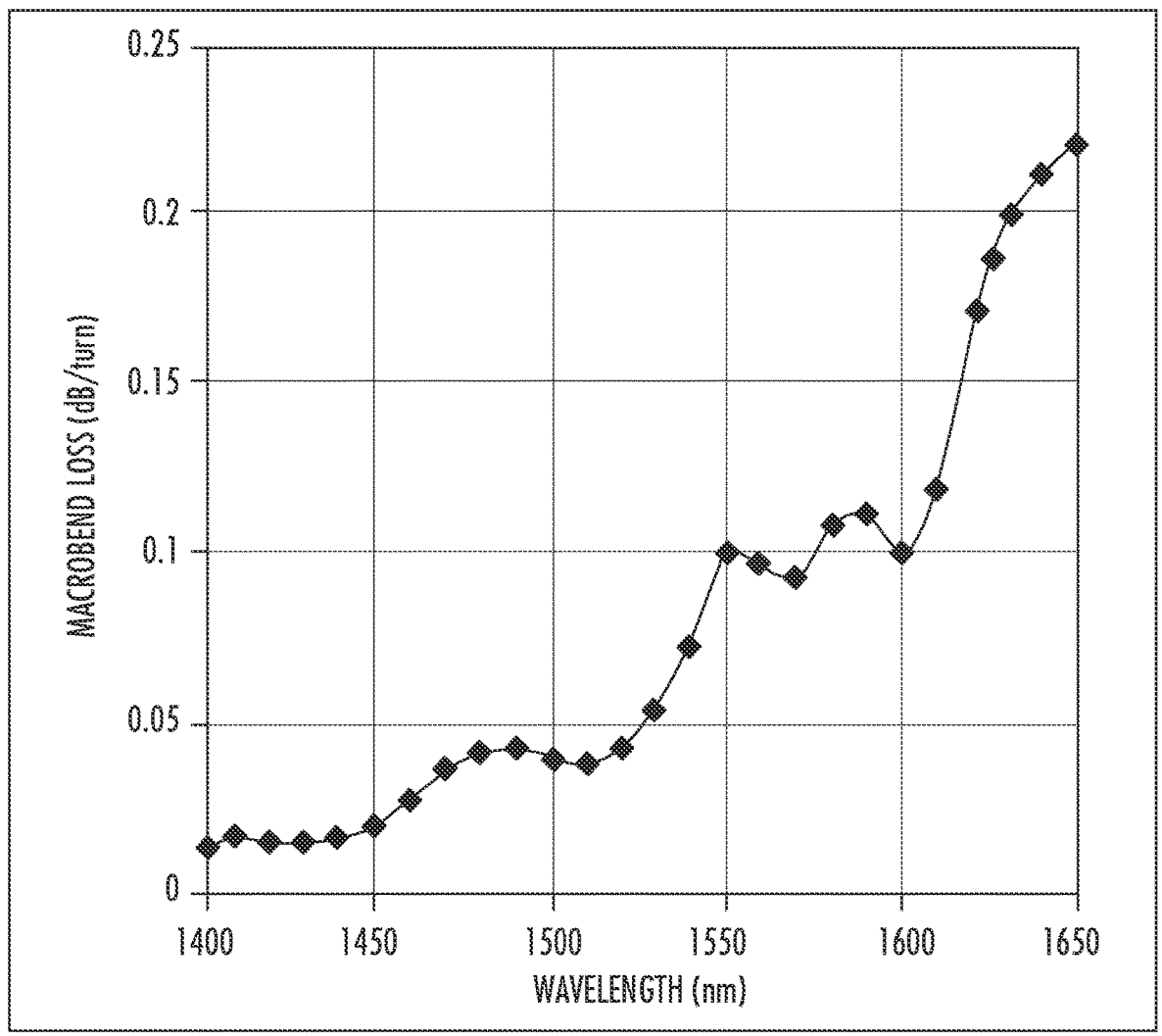
FIG. 9 is a plot of the measured macro-bend induced loss when the optical fiber corresponding to FIG. 6 was wrapped around a mandrel with a diameter of 10 mm.

FIG. 9 illustrates macrobend induced loss for example B fiber described above. The macrobend induced loss was measured when the example B fiber was wrapped two times around a mandrel having a diameter of 10 mm. The measured macrobend-induced attenuation is 0.1 dB/turn at a wavelength of 1550 nm and 0.19 dB/turn at a wavelength of 1625 nm.

Datacom and Telecom Compatible Fiber Optic Cables

The foregoing description relates to small-diameter fiber optic cables having cable jackets with low coefficients of friction and optical fibers with reduced cladding and coating diameters. Such cables are particularly suited for use as small diameter switch cables.

Figure 10:
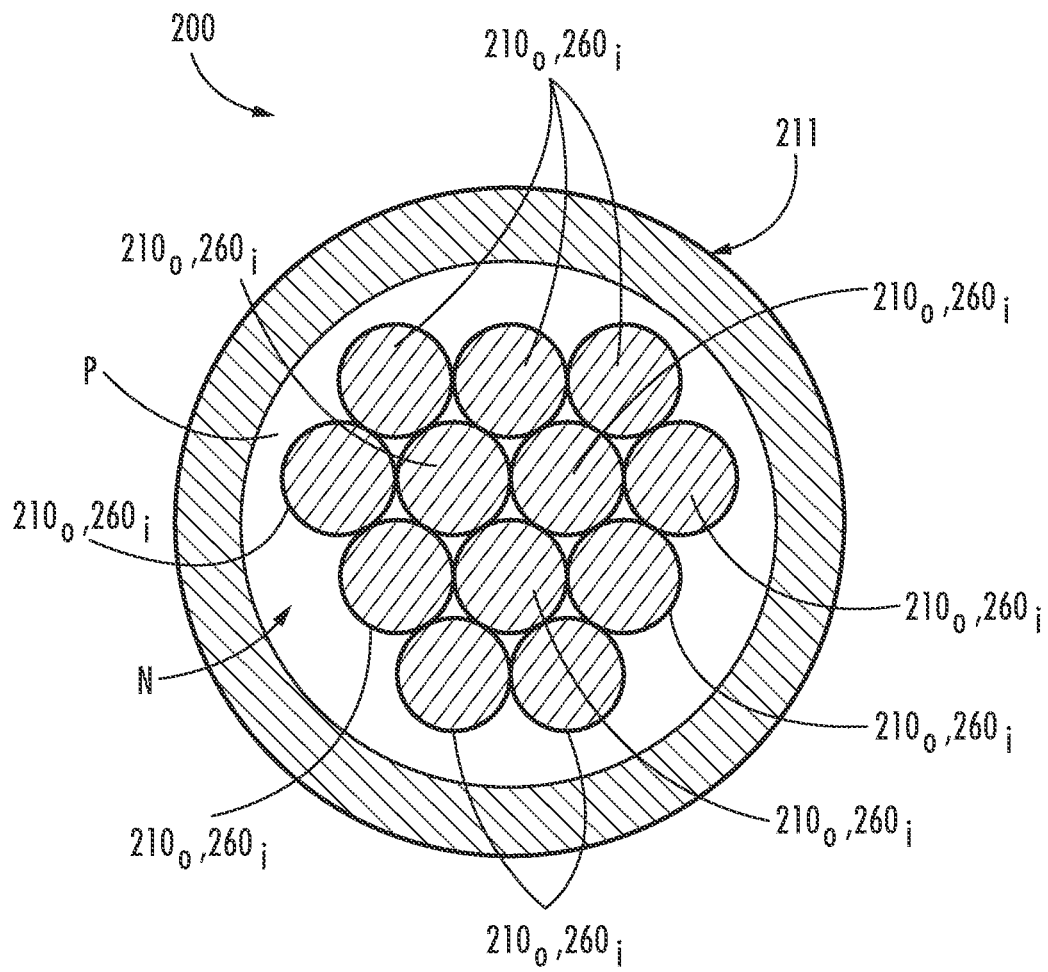
FIGS. 10 and 11 are cross-sectional views of fiber optic cables in accordance with embodiments disclosed herein.
Figure 11:
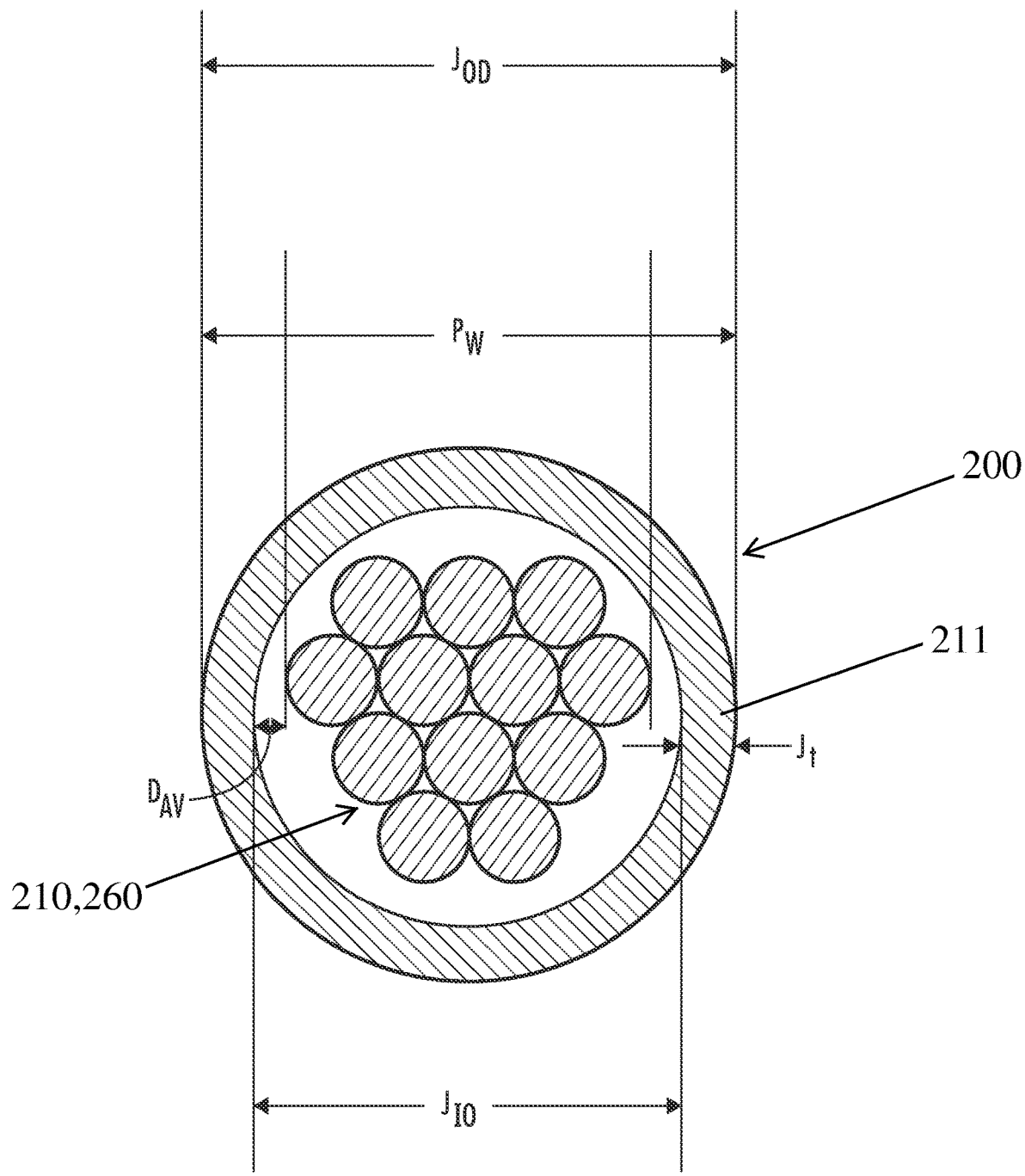

FIGS. 10 and 11 show an exemplary embodiment of a fiber optic cable 200, including a plurality N of optical fibers 210, 260. Each optical fiber 210, 260 has a core that is preferably datacom and telecom compatible. As used herein, the term "datacom and telecom compatible" generally refers a core of an optical fiber that at least meets one or more standards for single-mode optical fiber. Such standards, for example, are described in ITU-T G.652x and ITU-T G.657.

The plurality N optical fibers included in the cable 200 is defined as N≥4 and alternatively N≥4, and/or N≤16. The cable 200 is configured such that the plurality of optical fibers 210, 260 are suitable for use as strength members. Accordingly, the cable 200 preferably is free from strength members such as yarns, fiber glass rods, and/or steel wires.

In this particular embodiment, N=12, thus the fiber optic cable 200 includes twelve (12) optical fibers arranged in a pattern P. In this particular pattern, the cable 200 includes a plurality of central fibers 210*i*, 260*i* and a plurality of surrounding fibers 210*o*, 260*o*. The fiber optic cable 200 shown in this embodiment specifically includes three (3) central fibers and nine (9) surrounding fibers.

Preferably, the pattern P forms a hexagonal, close pack configuration defined in part by a fiber pack width Pw, as shown in FIG. 11. The pattern P shown, however, should not be construed as limiting. The pattern may form other various shapes, including, but not limited to triangular, semi-circular, curvilinear, diamond patterns, as well as other commonly known fiber patterns disposed within fiber optic cables. This pattern P of optical fibers 210, 260 is preferably effective in balancing tensile loads across all the optical fibers within the cable. This pattern P of optical fibers also prevents uneven load distributions such that applied loads are proportionally loaded. This proportional distribution thus prevents the fibers from breaking while under load. The proportional load distribution is also achieved by controlling the excess fiber length between the longest and shortest fibers within the cable to within about 0.010% and preferably within about 0.005%.

The cable 200 includes a jacket 211 configured to protect the optical fibers 210, 260 from being damaged. The jacket 211 is positioned an average distance $D_{AV}$ away from the surrounding fibers 210*o*, 260*o* with respect to the inner diameter of the jacket $J_{ID}$ and extends longitudinally to form an overall jacket length. The average distance $D_{AV}$ is such that the inner diameter of the jacket $J_{ID}$ has a loose fit with respect to the outermost surfaces of the surrounding optical fibers 210*o*, 260*o*. Preferably, the inner diameter of the jacket $J_{ID}$ is about 15% greater than the width of four stacked optical fibers and more preferably about 20% greater than width of four stacked optical fibers. In addition, during manufacture, the jacket 211 is preferably extruded around the plurality of optical fibers such that the jacket has an average wall thickness Jt of about 0.1 μm.

Moreover, the average distance $D_{AV}$ provides enough diametrical area within the cable that the optical fibers 210, 260 can move radially and azimuthally with respect to each other and the cable jacket 211. This positioning of the fibers 210, 260 within the cable also allows the fibers 210, 260 to move to lower stress positions as the cable 200 is bent or flexed, which in turn reduces attenuation and overall stress on the fibers.

The jacket is preferably manufactured from hard materials, having low coefficients of friction. Providing low friction jacketing materials can be advantageous, particularly for fiber optic cables that are used in switch applications, an example of which is shown in FIG. 12.

Exemplary jacket materials include but are not limited to fluorinated ethylene propylene (FEP), which has a coefficient of friction lower than materials conventionally used for interconnect cables (e.g. PVC and LSZH polymer compositions). The jacket is also preferably manufactured from materials having a static coefficient of friction ranging from about 0.04 to about 0.4. Other exemplary materials for jacket manufacture include, but are not limited to ethylenechlorotrifluoroethylene (ECTFE), perfluoroalkoxy polymers (PFA), polytetrafluoroethylene (PTFA), ethylene tetrafluoriethylene (ETFE) and Polybutylene terephthalate (PBT). Table V provides various properties of preferred materials for jacket manufacture.

TABLE V

| | | | | | | | |
|---|---|---|---|---|---|---|---|
| Properties of Exemplary Cable Jacket Materials | | | | | | | |
| Property | ASTM Standard | Unit | PTFE | FEP | PFA | ETFE | PBT |
| Specific Gravity | D792 | — | 2.15 | 2.15 | 2.15 | 1.76 | 1.31 |
| Tensile Strength | D1457 D1708 D638 | Mpa | 21-34 | 23 | 25 | 40-46 | |
| | | (psi) | 3000-5000 | 3400 | 3600 | 5800-6700 | 7500 |
| Elongation | D1457 D1708 D638 | % | 300-500 | 325 | 300 | 150-300 | 60 |

TABLE V-continued

Properties of Exemplary Cable Jacket Materials

| Property | ASTM Standard | Unit | PTFE | FEP | PFA | ETFE | PBT |
|---|---|---|---|---|---|---|---|
| Flexural Modulus | D790 | Mpa (psi) | 496 72000 | 586 85000 | 586 85000 | 1172 170000 | 4068 590000 |
| Folding Endurance | D2176 | (MIT) cycles | >$10^6$ | 5-80 × $10^3$ | 10-500 × $10^3$ | 10-27 × $10^3$ | 2 × $10^3$ |
| Impact Strength | D256 | J/m | 189 | No Break | No Break | No Break | 85 |
| Hardness | D2240 | Shore D pencil | 50-65 HB | 56 HB | 60 | 72 | 74 |
| Coefficient of Friction, Dynamic | D1894 | — | — | 0.05-0.10 | 0.08-0.3 | — | 0.3-0.4 | 0.22 |

Preferably, the jacket material has a small difference between its static and dynamic coefficients of friction. This property is known in the art as a "slip-stick" characteristic. In preferred embodiments, the dynamic coefficient of friction of the plastic jacket is with the range of about 0.04 to 0.4 and the difference between the static and dynamic coefficients of friction is less than 0.2.

The low friction provided by the jacket 211 is also preferably balanced by mechanical strength and hardness of the cable 200. Specifically, the hardness of the jacket is preferably greater than about 45 Shore D, more preferably greater than about 50 Shore D and even more preferably greater than about 55 Shore D. This combination of low friction and mechanical strength can be achieved by blending relatively weak polymers having low coefficients of friction [such as polytetrafluoroethylene (PTFE)] with inherently stronger polymeric compounds.

FIG. 2 of U.S. Pat. No. 10,042,122 B2 shows an exemplary optical switch device, which is particularly suited for use with the embodiments of fiber optic cables and optical fibers disclosed herein. U.S. Pat. No. 10,042,122 B2 is incorporated herein by reference in its entirety.

Another specific application particularly suited for use with the embodiments of fiber optic cables and optical fibers disclosed herein occurs when one end of a fiber optic cable is coupled to an integrated circuit chip and the other end of the cable is attached to a multi-fiber connector such as an MTP connector. In this application, the small diameter optical fibers are configured for placement into a multi-fiber connector with about 250 μm hole spacing through use of an alignment jig, thereby eliminating the need to separate fibers from a ribbon matrix.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A fiber optic cable, comprising:
a cable jacket having an outer surface defined by a cable jacket outer diameter $J_{OD}$ and an inner surface defined by a cable jacket inner diameter $J_{ID}$;
a plurality N of optical fibers, where N≥4, contained within the cable jacket and positioned a distance away from the cable jacket inner diameter,
wherein each optical fiber comprises a core, a cladding surrounding the core, and at least one coating surrounding the core, the at least one coating having a coating diameter less than or equal to about 200 microns,
wherein the cable jacket outer diameter $J_{OD}$ is less than or equal to 1 mm, and
wherein the cable jacket comprises at least one material having a coefficient of friction ranging from about 0.04 to about 0.4, thereby allowing relative movement between the cable jacket and the cable core and/or optical fiber.

2. The fiber optic cable of claim 1, wherein the cable jacket outer diameter $J_{OD}$ is about $(0.19\sqrt{N}+0.4$ mm) or less.

3. The fiber optic cable of claim 1, wherein the plurality N of optical fibers is N≥8 and N≤16.

4. The fiber optic cable of claim 3, wherein the plurality N of optical fibers is equal to 12.

5. The fiber optic cable of claim 1, wherein the cable is free from yarn, fiber glass, and steel strength members.

6. The fiber optic cable of claim 1, wherein the cladding has a cladding diameter less than about 100 microns.

7. The fiber optic cable of claim 1, wherein the plurality of optical fibers has an average attenuation of less than about 0.5 dB/km at 1310 nm and less than about 0.4 dB/km at 1550 nm.

8. The fiber optic cable of claim 1, wherein the cladding has a cladding diameter less than about 85 microns.

9. The fiber optic cable of claim 1, wherein the coating diameter is less than about 170 microns.

10. The fiber optic cable of claim 1, wherein each optical fiber has an MFD greater than about 8.2 microns at a wavelength of 1310 nm and a cutoff wavelength less than 1280 nm.

11. The fiber optic cable of claim 1, wherein the plurality of optical fiber N forms a hexagonal configuration in a pattern P.

12. The fiber optic cable of claim 11, wherein the pattern P prevent uneven load distributions.

13. The fiber optic cable of claim 1, wherein the plurality of optical fibers N includes long fibers and short fibers and wherein excess fiber length between the long fibers and the short fibers is within about 0.010%.

14. The fiber optic cable of claim 1, wherein the plurality of optical fibers N includes long fibers and short fibers and wherein excess fiber length between the long fibers and the short fibers is within about 0.005%.

15. The fiber optic cable of claim 1, wherein the cable jacket inner diameter $J_{ID}$ is about 15% greater than the width of four stacked optical fibers in the plurality of optical fibers N.

16. The fiber optic cable of claim 1, wherein the cable jacket inner diameter $J_{ID}$ is about 20% greater than the width of four stacked optical fibers in the plurality of optical fibers N.

17. A fiber optic cable, comprising:

a cable jacket having an outer diametrical surface defined by a cable jacket outer diameter $J_{OD}$ and an inner diametrical surface defined by a cable jacket inner diameter $J_{ID}$;

a plurality N of optical fibers, where N≥4, contained within the cable jacket and positioned a distance away from the cable jacket inner diameter, wherein each optical fiber comprises a core, the core having an outer radius $r_1$;

a cladding surrounding the core, the cladding having an outer radius $r_4$, wherein $r_4$ is less than 45 microns;

a primary coating surrounding the cladding, the primary coating having an outer radius $r_5$ and a thickness $t_P > 10$ microns, an in situ modulus $E_P$, wherein $E_P$ is 0.35 MPa or less, and a spring constant $\chi_P < 1.6$ MPa, where $\chi_P = 2E_P r_4/t_P$; and a secondary coating surrounding the primary coating, the secondary coating having an outer radius $r_6$ and a thickness $t_S = r_6 - r_5$, and an in situ modulus of 1200 MPa or greater;

wherein $t_S$ is greater than 10 microns, the outer radius $r_6$ is about 90 microns or less, and the optical fiber has a mode field diameter 1MFD greater than about 8.2 microns at 1310 nm, a fiber cutoff wavelength of less than 1310 nm, and the optical fiber exhibits a bend loss when wrapped around a mandrel having a diameter of 10 mm, of less than 1.0 dB/turn at a wavelength of 1550 nm.

18. The fiber optic cable of claim 17, wherein $\chi_P \leq 1.3$ MPa.

19. The fiber optic cable of claim 17, where wherein the cable jacket comprises at least one material having a coefficient of friction ranging from about 0.04 to about 0.4.

20. An optical switch device, comprising the fiber optic cable of claim 17.

* * * * *

UNITED STATES PATENT AND TRADEMARK OFFICE
CERTIFICATE OF CORRECTION

PATENT NO. : 11,448,842 B2
APPLICATION NO. : 17/210734
DATED : September 20, 2022
INVENTOR(S) : Scott Robertson Bickham et al.

It is certified that error appears in the above-identified patent and that said Letters Patent is hereby corrected as shown below:

On the Title Page

In item (56), in Column 2, under "Other Publications", Line 2, delete "Lightwwave" and insert -- Lightwave --.

In the Claims

In Column 37, Line 15, in Claim 17, delete "$r_5\_and$" and insert -- $r_5$ and --.

In Column 38, Line 7, in Claim 17, delete "1MFD" and insert -- MFD --.

In Column 38, Line 13, in Claim 19, after "claim 17," delete "where".

Signed and Sealed this
Twenty-ninth Day of November, 2022

Katherine Kelly Vidal
*Director of the United States Patent and Trademark Office*